Figure 1:
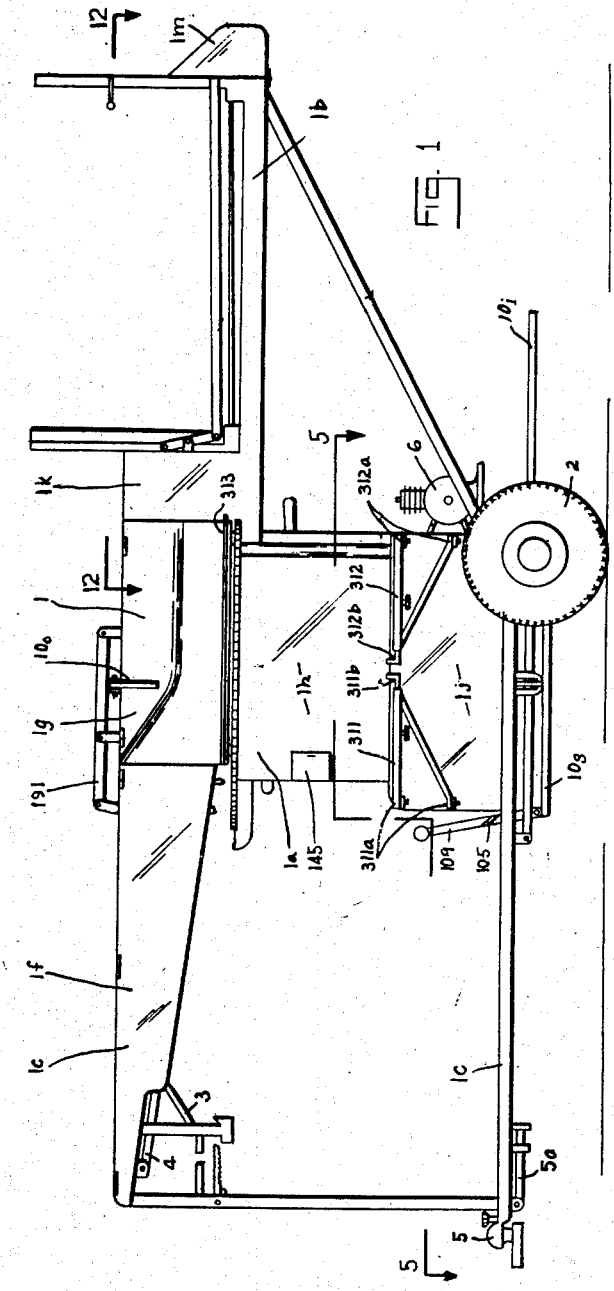

Sept. 22, 1953

K. R. FUNNELL 2,652,932

MACHINE FOR LOADING BUNDLES OF TOBACCO LEAVES ONTO STICKS

Filed Sept. 7, 1948

18 Sheets-Sheet 1

INVENTOR.
KENNETH R. FUNNELL
BY
Young, Emery & Thompson
ATTYS.

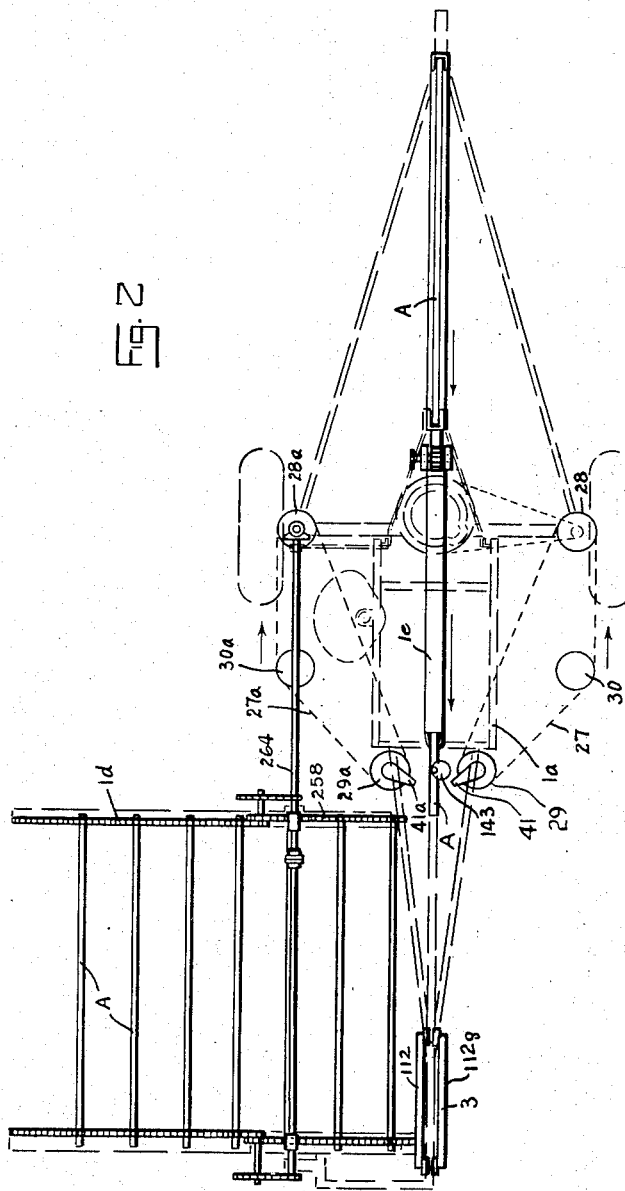

Sept. 22, 1953     K. R. FUNNELL     2,652,932
MACHINE FOR LOADING BUNDLES OF TOBACCO LEAVES ONTO STICKS
Filed Sept. 7, 1948     18 Sheets-Sheet 3
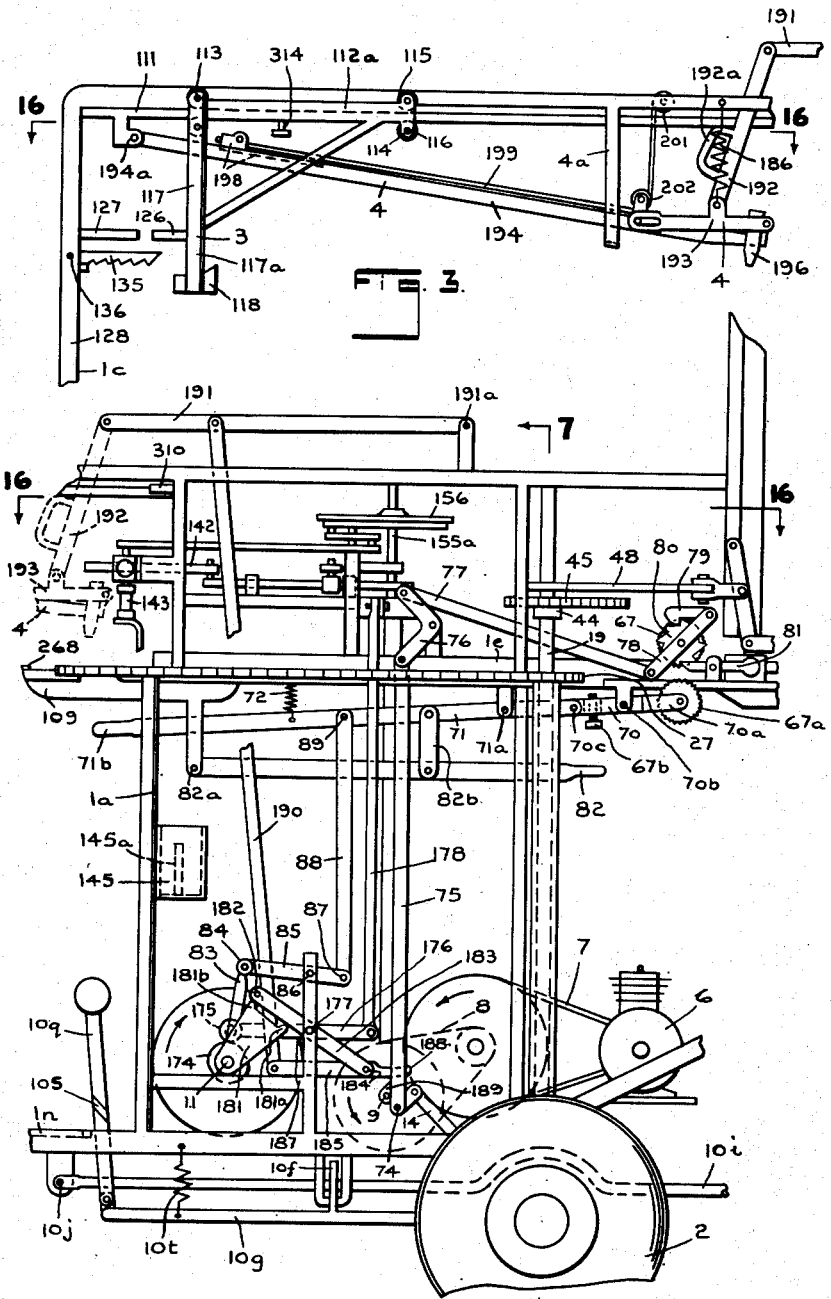
INVENTOR.
KENNETH R. FUNNELL
BY
Young, Emery & Thompson
Attys.

Sept. 22, 1953     K. R. FUNNELL     2,652,932
MACHINE FOR LOADING BUNDLES OF TOBACCO LEAVES ONTO STICKS
Filed Sept. 7, 1948     18 Sheets-Sheet 4
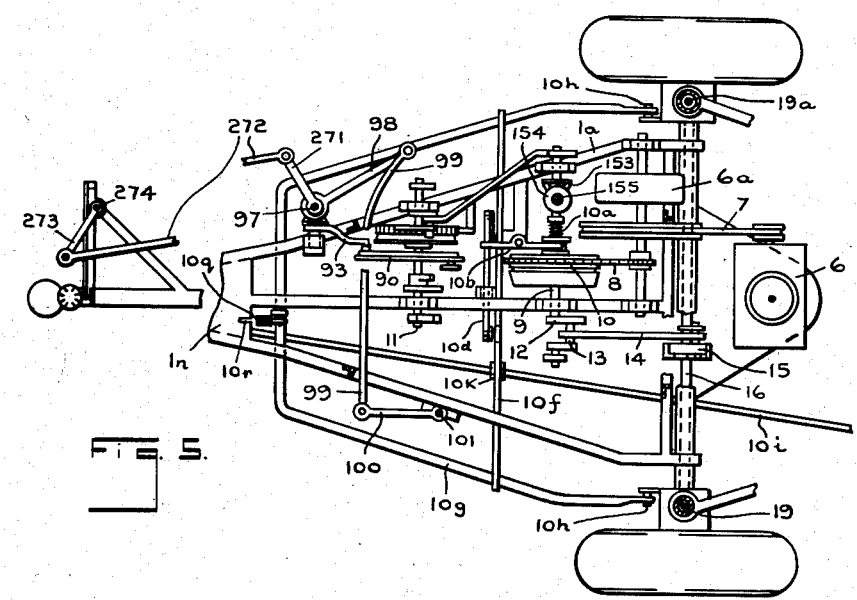
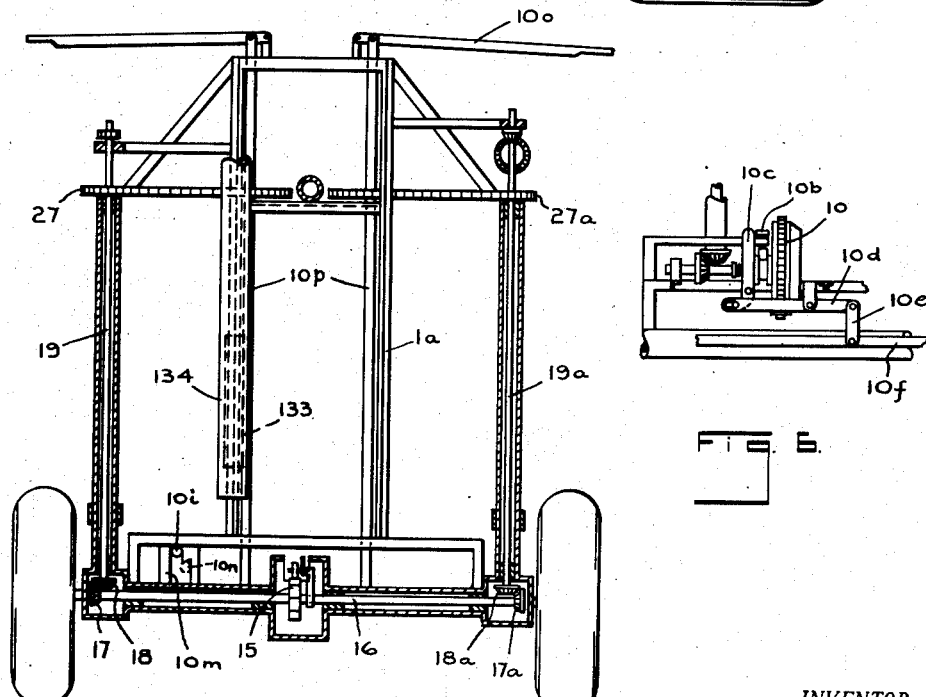
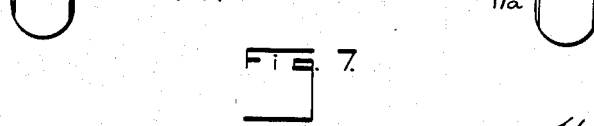
INVENTOR.
KENNETH R. FUNNELL
BY
Young, Emery & Thompson
Attys.

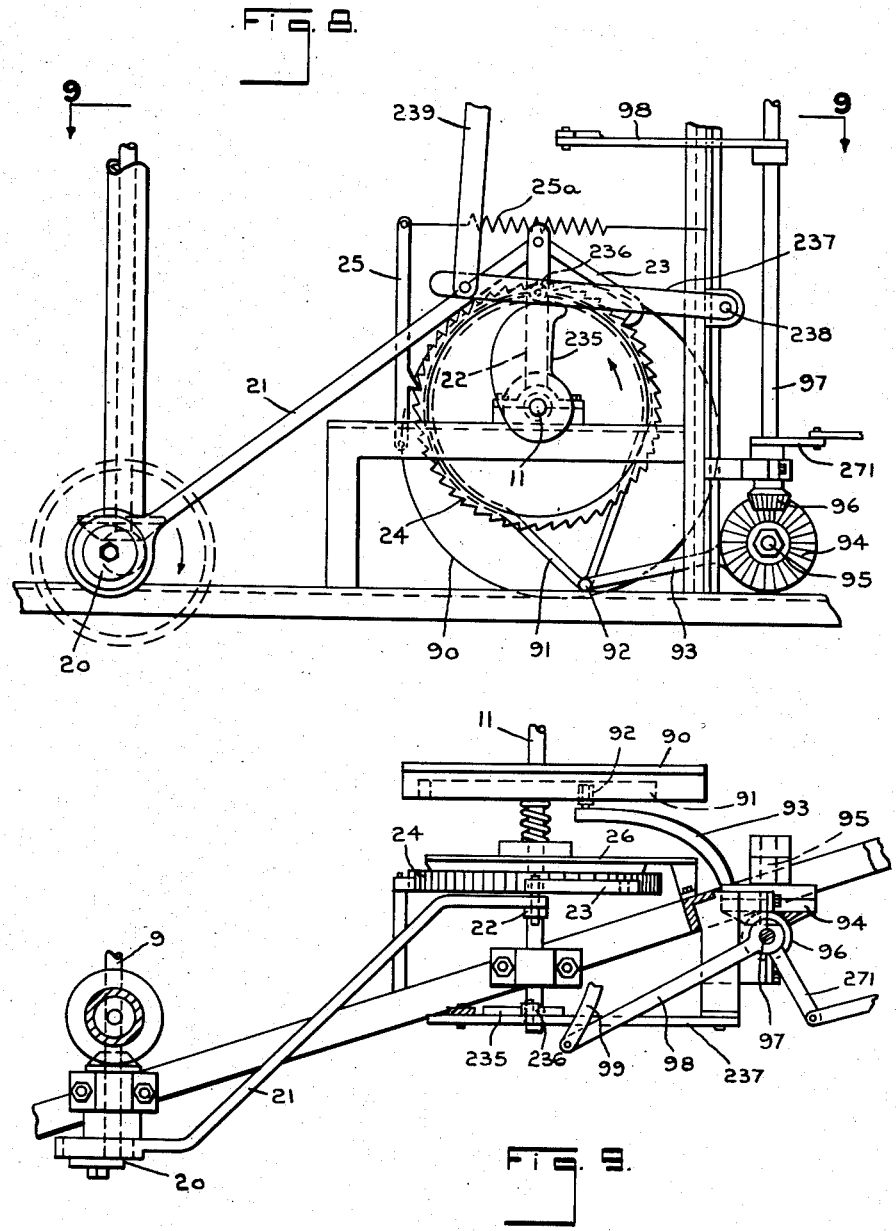

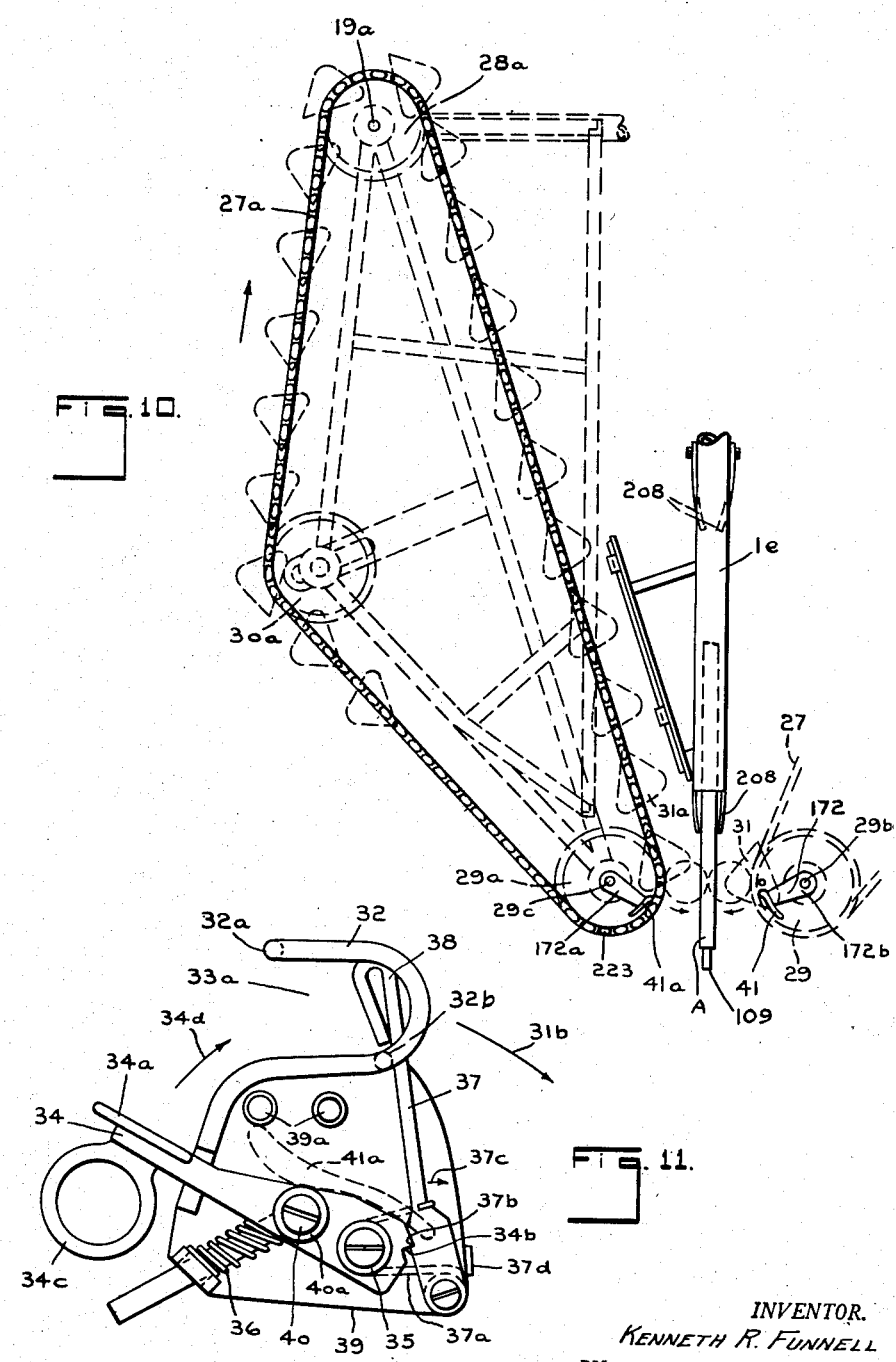

INVENTOR.
KENNETH R. FUNNELL

Sept. 22, 1953 K. R. FUNNELL 2,652,932
MACHINE FOR LOADING BUNDLES OF TOBACCO LEAVES ONTO STICKS
Filed Sept. 7, 1948 18 Sheets-Sheet 8
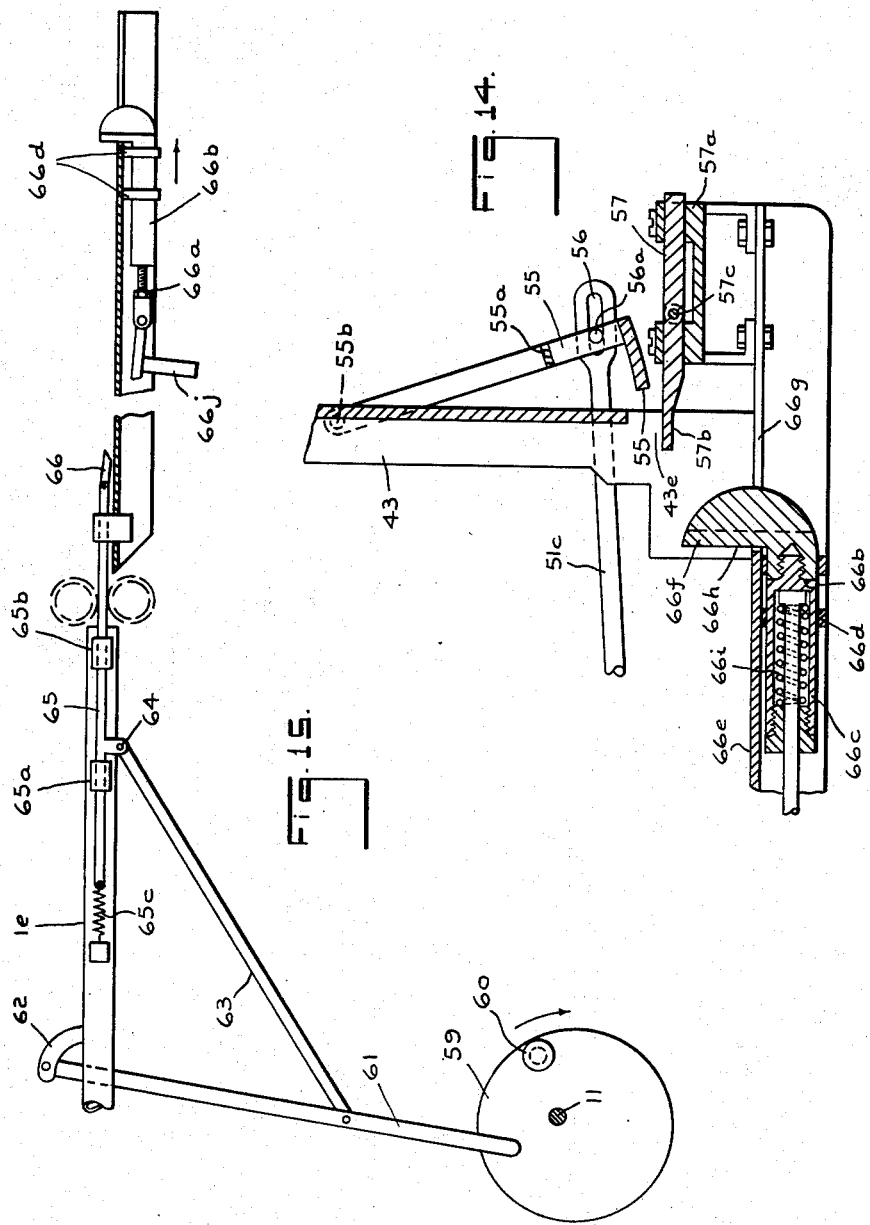
INVENTOR.
KENNETH R. FUNNELL
BY
Young, Emery & Thompson
Attys.

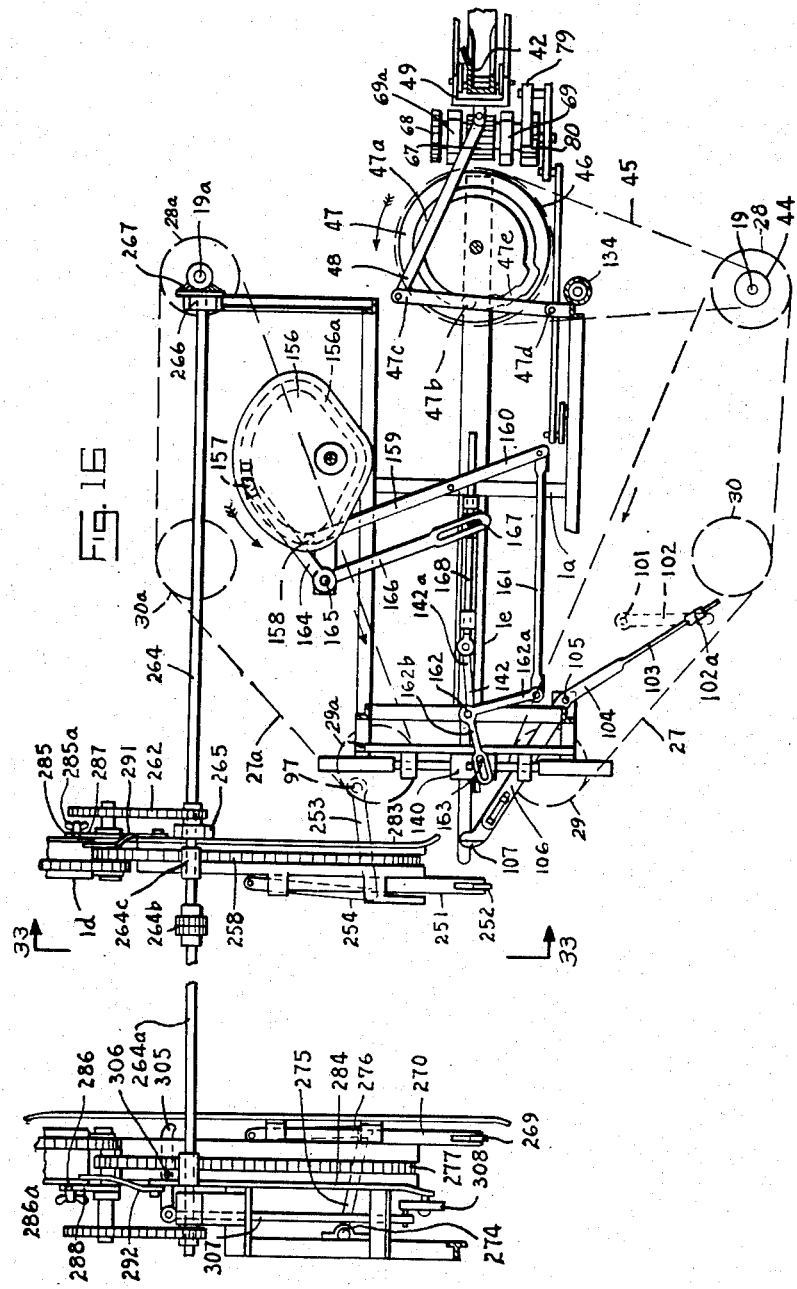

Sept. 22, 1953 K. R. FUNNELL 2,652,932
MACHINE FOR LOADING BUNDLES OF TOBACCO LEAVES ONTO STICKS
Filed Sept. 7, 1948 18 Sheets-Sheet 10
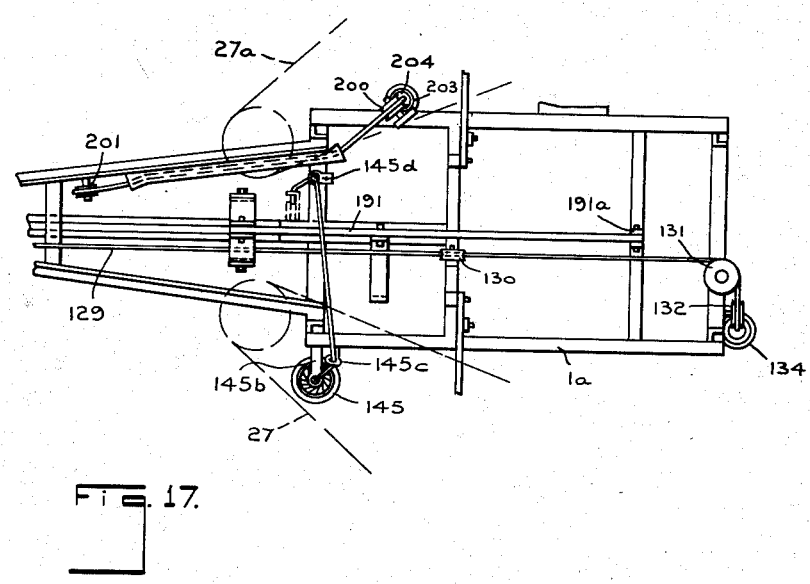
Fig. 17.
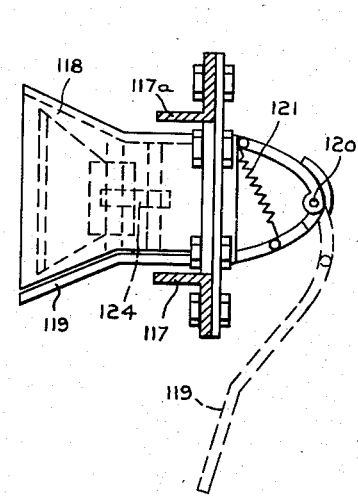
Fig. 19.
Fig. 18.
INVENTOR.
KENNETH R. FUNNELL
BY
Young, Emery & Thompson
Attys.

Sept. 22, 1953 K. R. FUNNELL 2,652,932
MACHINE FOR LOADING BUNDLES OF TOBACCO LEAVES ONTO STICKS
Filed Sept. 7, 1948 18 Sheets-Sheet 11

INVENTOR.
KENNETH R. FUNNELL
BY
Young, Emery & Thompson
Attys.

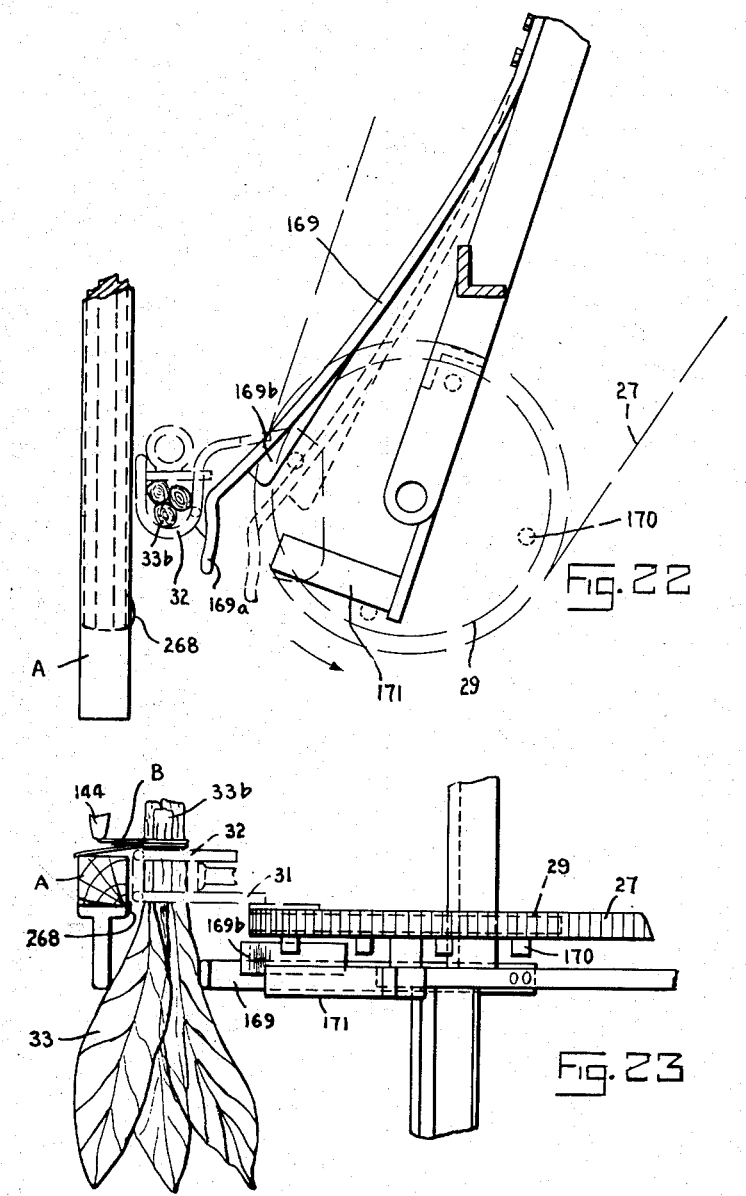

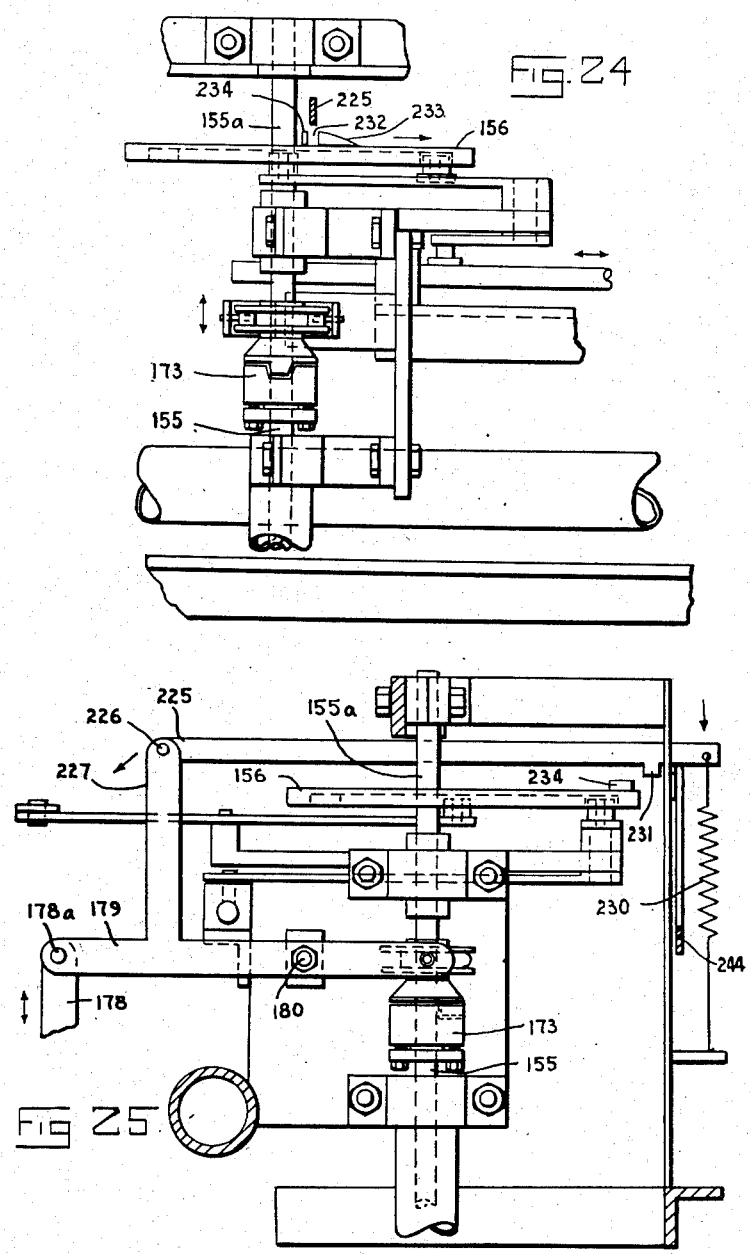

Sept. 22, 1953 K. R. FUNNELL 2,652,932
MACHINE FOR LOADING BUNDLES OF TOBACCO LEAVES ONTO STICKS
Filed Sept. 7, 1948 18 Sheets-Sheet 14

INVENTOR.
KENNETH R. FUNNELL
BY
Young, Emery & Thompson
Att'ys.

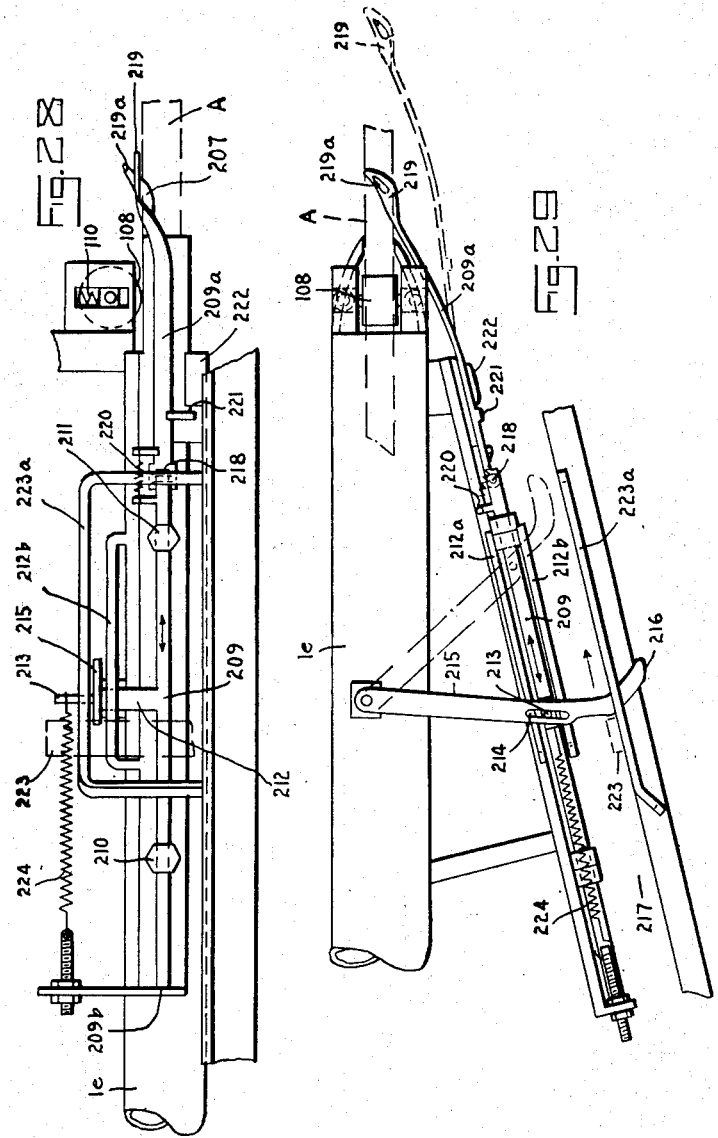

Sept. 22, 1953 K. R. FUNNELL 2,652,932
MACHINE FOR LOADING BUNDLES OF TOBACCO LEAVES ONTO STICKS
Filed Sept. 7, 1948 18 Sheets-Sheet 16
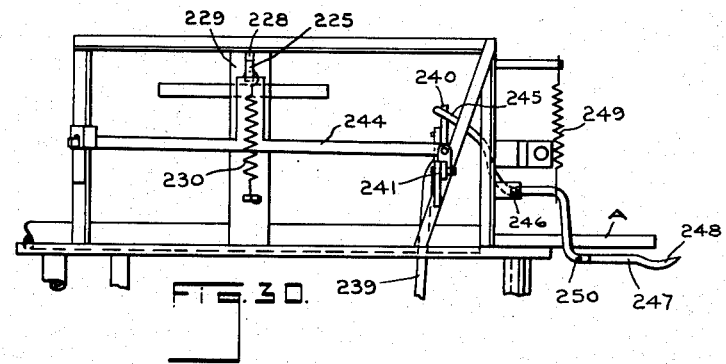
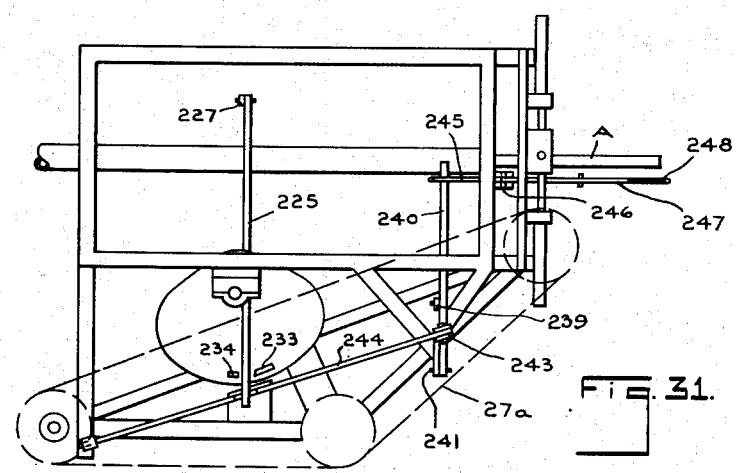
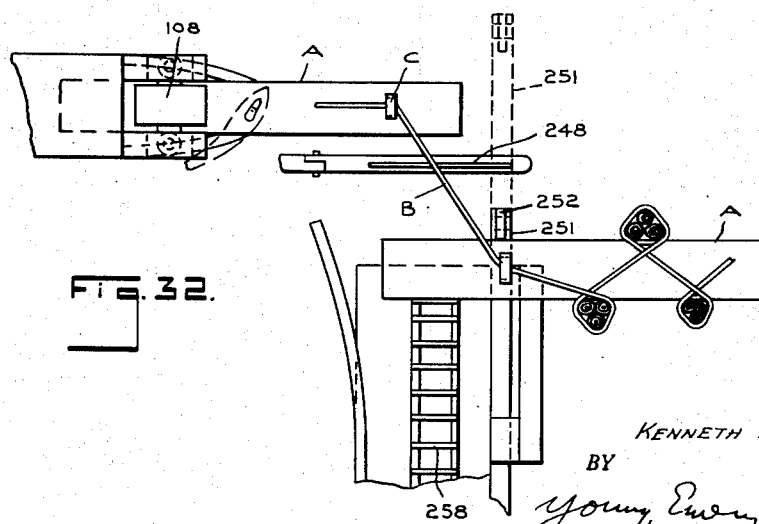
INVENTOR.
KENNETH R. FUNNELL
BY
Young, Emery & Thompson
Attys.

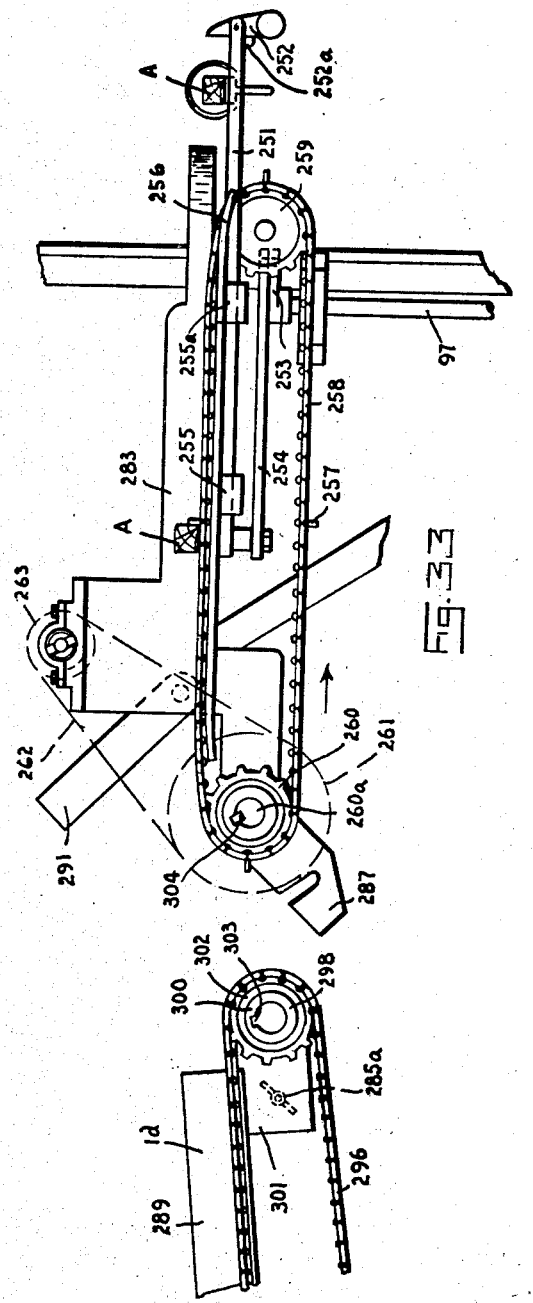

Sept. 22, 1953      K. R. FUNNELL      2,652,932
MACHINE FOR LOADING BUNDLES OF TOBACCO LEAVES ONTO STICKS
Filed Sept. 7, 1948      18 Sheets-Sheet 18
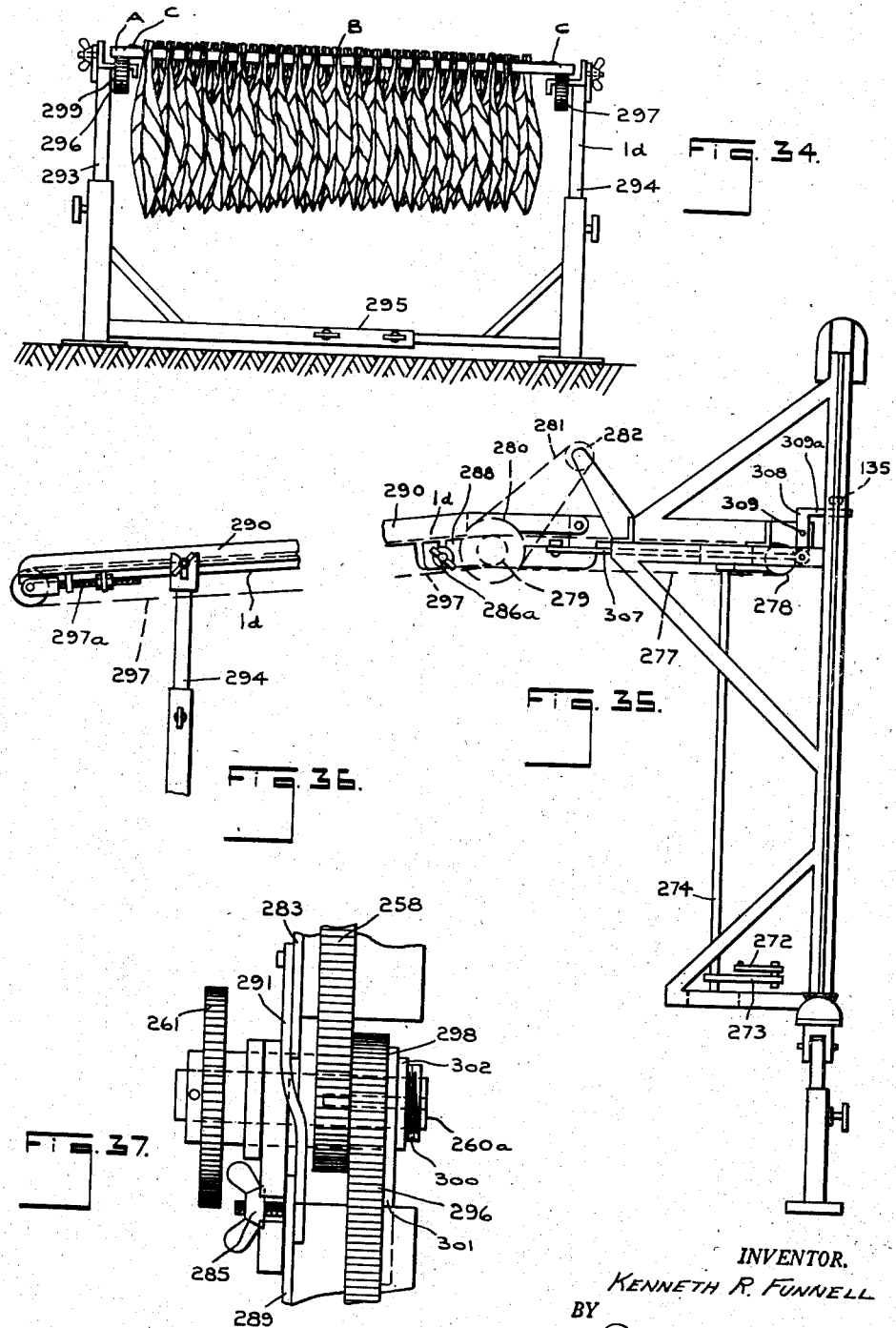
INVENTOR.
KENNETH R. FUNNELL
BY
Young, Emery & Thompson
Attys.

Patented Sept. 22, 1953

2,652,932

UNITED STATES PATENT OFFICE 2,652,932

MACHINE FOR LOADING BUNDLES OF TOBACCO LEAVES ONTO STICKS

Kenneth R. Funnell, Blenheim, Marlborough, New Zealand, assignor to Funnell's Inventions Limited, Blenheim, Marlborough, New Zealand Application September 7, 1948, Serial No. 47,988
In New Zealand July 30, 1946

24 Claims. (Cl. 214—5.5)

This invention relates to a machine for loading or placing bundles of tobacco leaves onto sticks, wherein the bundles are tied together by string or the like and located alternately at opposite sides of the stick. The invention is applicable particularly, though not solely, to the loading of bundles of green tobacco leaves onto sticks in the field preparatory to kiln treatment, and it is also applicable to the loading of bundles of tobacco leaves onto sticks preparatory to factory processing.

The invention aims primarily to provide for the convenient and effective holding and conveying of the bundles of leaves preparatory to and during tying.

The invention also aims to provide a machine for the above purpose in which the time and manual labour involved in loading the bundles onto the sticks is reduced, and effective and consistent results are obtained.

Figure 12:
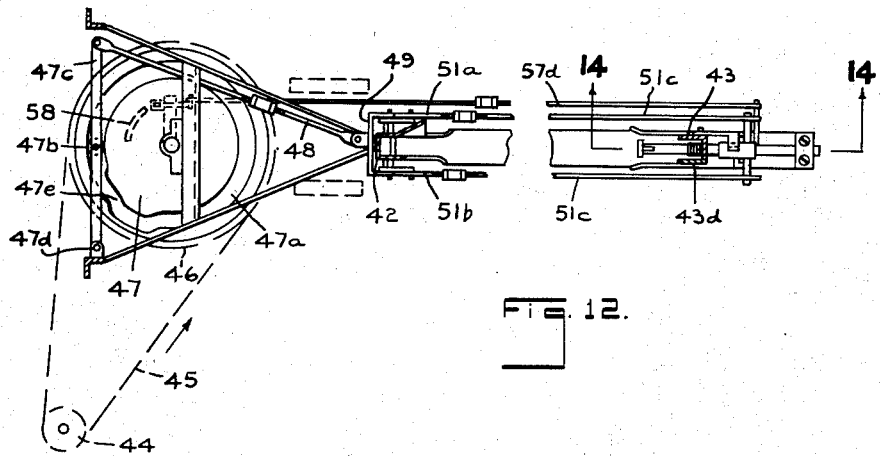
Figure 13:
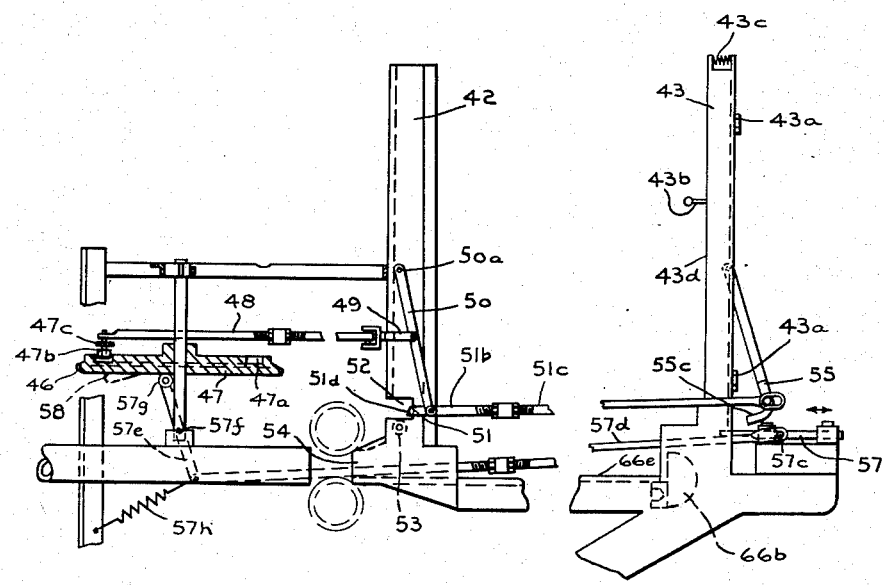
Figures 20, 21:
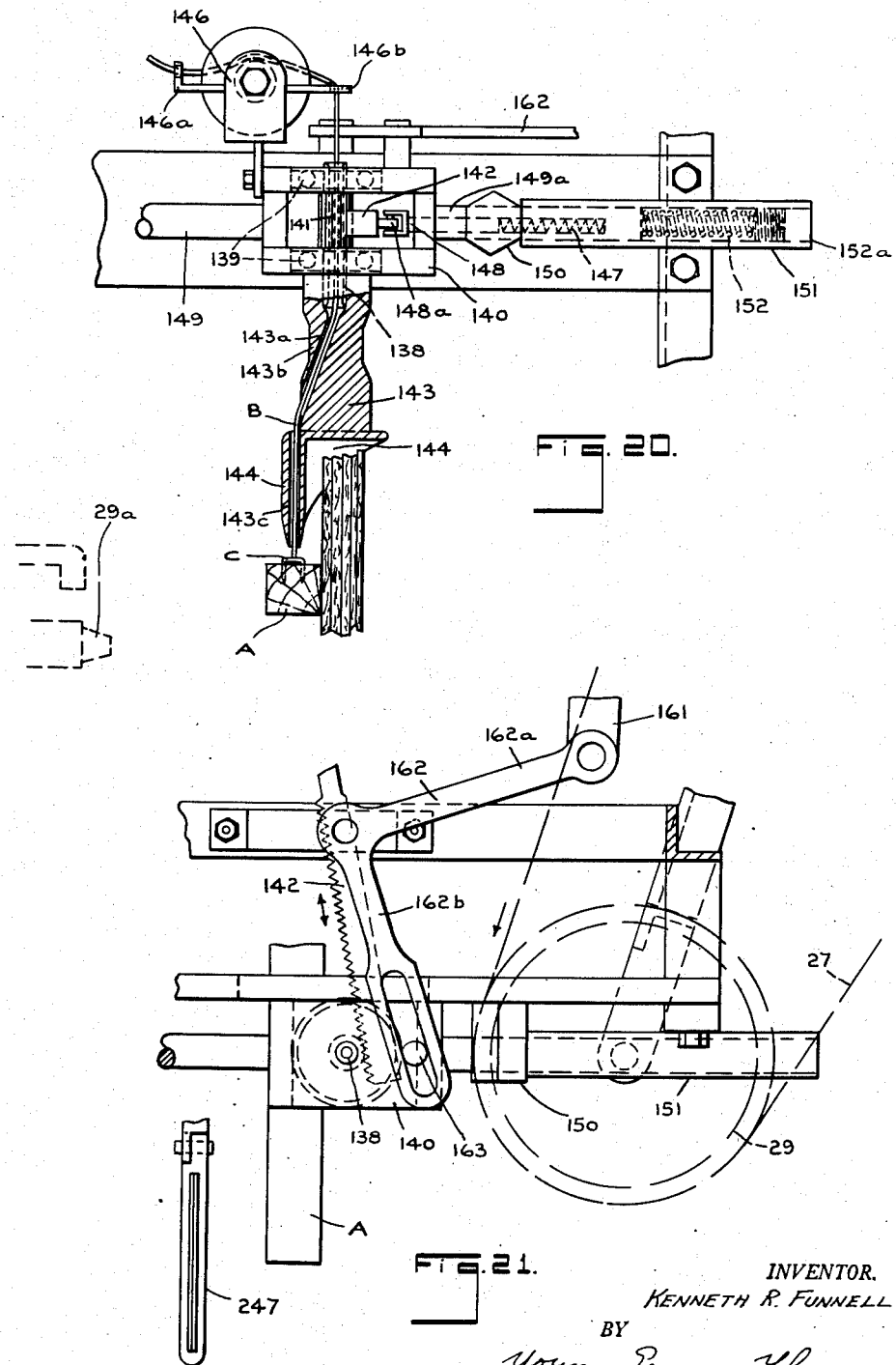
Figure 26:
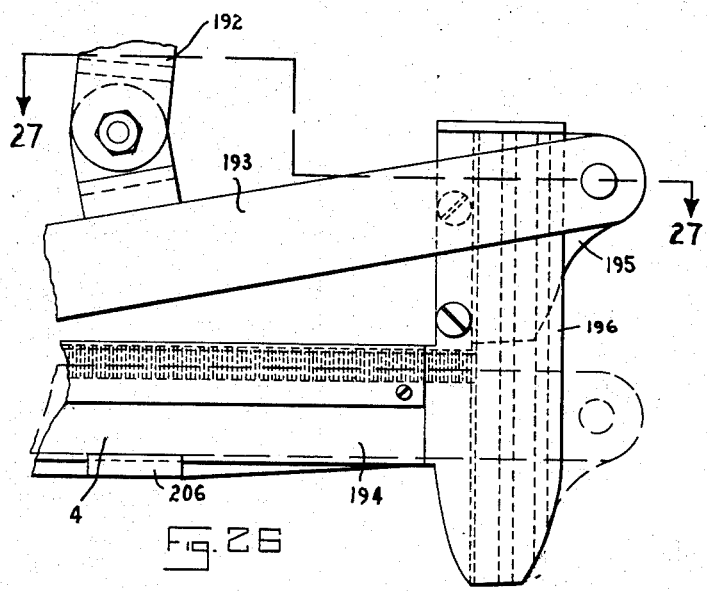
Figure 27:
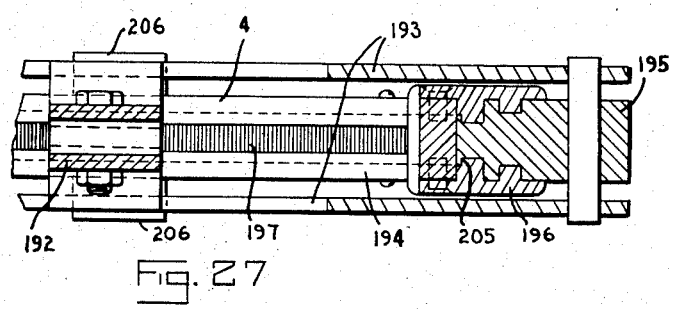

In the accompanying drawings,

Figure 1 is a side elevation of a machine constructed according to the present invention for loading bundles of tobacco leaves onto sticks preparatory to kiln drying, Figure 2 is a diagrammatic plan illustrating the functioning of the machine, Figure 3 is a part side elevation of the front of the machine with the shields removed, Figure 4 is a part side elevation of the intermediate part of the machine with the shields removed, Figure 5 is a diagrammatic horizontal section on the line 5—5, Figure 1, the shields being omitted, Figure 6 is a front elevation of the main clutch and some associated parts, Figure 7 is a part vertical section on the line 7—7, Figure 4, showing the drive transmission from the primary ratchet mechanism to the vertical rear intermittent driving shafts, and showing the carriage return weight tube, Figure 8 is a part side elevation of the intermittent drive from the primary or rear timing shaft to the secondary or front timing shaft, showing also the first part of the drives to the stick removal pawls and to the stick stop arm, and other details, Figure 9 is a horizontal section on the line 9—9, Figure 8, Figure 10 is a partly diagrammatic plan of one of the leaf conveyor chains, showing its position relatively to the forward end of the stick tube and the location of the clip releasing means and some other parts, Figure 11 is a plan of one of the leaf clips carried by the leaf conveyor chains, Figure 12 is a broken horizontal section through the stick magazine on the line 12—12, Figure 1, Figure 13 is a broken side elevation thereof, the magazine control cam being shown in section, Figure 14 is a vertical section on the line 14—14, Figure 12, showing part of the means for feeding sticks from the magazine, Figure 15 is a diagrammatic broken longitudinal section through the lower part of the magazine, showing in side elevation a part of the stick tube and part of the means for feeding the sticks from the magazine, Figure 16 is a diagrammatic horizontal section on the line 16—16, Figures 3 and 4, showing the general arrangement of the cam and linkage for effecting the tying, and the magazine control cam, the stick removal chains, and asosciated parts, Figure 17 is a part plan of the machine, showing the general arrangement of much of the upper part of the machine, including the carriage return mechanism, Figure 18 is a side elevation of the carriage cup and some associated parts, with a stick in position, the side of the cup being shown open for convenience and the bottom of the cup being shown depressed in broken outline, Figure 19 is a section on the line 19—19, Figure 18, the side of the cup being shown closed in full lines and hinged open in broken outline, Figure 20 is a part front elevation of the tying head, the tying member being shown in section, the location of one of the front sprockets of the leaf conveyor chains being shown;

Figure 21 is a part plan of the tying head, the machine being cut through on the lines 16—16, Figures 3 and 4, Figure 22 is a plan of one of the leaf guides, showing diagrammatically the actuating means therefor and some adjacent parts, Figure 23 is a front elevation corresponding with Figure 22, Figure 24 is a part side elevation of the cam and linkage for effecting tying and means for disengaging the drive to the cam when each stick is fully loaded with leaves, Figure 25 is a rear elevation corresponding with Figure 24, Figure 26 is a side elevation of the stapler head and associated parts, Figure 27 is a section on the line 27—27, Figure 26, Figure 28 is a side elevation of the string guide and the actuating mechanism therefor, Figure 29 is a part plan corresponding with Figure 28, Figure 30 is a part side elevation of the frame of the machine, showing the string cutter and associated mechanism, Figure 31 is a part plan corresponding with Figure 30, Figure 32 is a part plan on a larger scale than Figures 30 and 31, showing the relationship between the string cutter and the loaded stick, Figure 33 is a vertical section on the line 33—33, Figure 16, showing the stick removal chain nearest to the stick tube, part of the associated secondary chain being shown detached, Figure 34 is a part side elevation of the stick removal extension, a loaded stick being shown in position, Figure 35 is a part front elevation of the machine, showing the location of the front stick removal chain, distant parts being omitted, Figure 36 is a part front elevation of the stick removal extension, and Figure 37 is a part plan of one of the couplings for the stick removal extension.

In the drawings, the parts are shown where possible in their positions immediately before the first tying operation on any particular stick. Much detail has been omitted in order to more clearly illustrate the invention.

The rigid structure 1 forming the frame and shell of the machine comprises an intermediate part 1a mounted on two rearwardly disposed pneumatic-tyred wheels 2, and with a rearward extension 1b forming a stick magazine (hereinafter described) and a forward extension 1c forming a guide-way for a carriage 3 (hereinafter described) and providing support for a stapler 4 (hereinafter described).

The forward extension 1c also has attached to it a ball socket fitting 5 for towing purposes and an extensible rest 5a to adjustably support the front of the machine when detached from the towing vehicle. The forward extension 1c also has a stick removal side extension 1d.

The intermediate part 1a of the rigid structure carries a stick tube 1e in line with the lower part of the magazine, and through which the sticks pass from the magazine preparatory to tying. The intermediate part 1a of the structure also supports a prime mover 6 and the greater part of the mechanism of the machine.

Guards and shields 1f to 1m are provided around the framework of the machine.

The prime mover 6 drives a primary timing shaft 9 through a belt reduction 7 and a chain reduction 8, the drive being disengageable by means of a manually and foot operable clutch 10, (Figures 5 and 6) and a flywheel 6a being provided.

The clutch 10 is held in engagement when desired by a spring 10a, and is released from engagement when desired by members 10b to 10f from a clutch control yoke 10g (Figures 1, 4 and 5) pivoted at 10h to the frame and located a short distance above the floor or ground, so as to be conveniently reached by foot. Depression of the yoke 10g causes disengagement of the drive.

The members 10b to 10f are also operable by a further foot control 10i (Figures 1, 4 and 5) pivoted at 10j to the frame, and pivoted at 10k (Figure 5) to a bracket carried by the cross-bar 10f, and passing through a slot in a plate 10m (Figure 7), the slot being stepped so that the control can be locked in the position shown at 10n and can be readily released from such position.

The cross-bar can also be operated by overhead hand levers 10o, Figures 1 and 7, per medium of the connecting rods 10p.

To hold the clutch disengaged so that the motor can operate without driving the machine, and so that the operator or operators need not hold the clutch open in the event of a mishap or when making an adjustment or in other circumstances, the lower end of a clutch locking lever 10q (Figures 1, 4 and 5) is pivoted to the front of the yoke 10g and slides through a slot 10r in a plate 1n and has thereon an inclined stop plate 10s which, on depression of the lever can be engaged beneath the plate 1n to prevent upward movement of the lever and consequently of the yoke 10g. The plate 10s, being inclined, does not prevent downward passage of the lever through the slot 10r, the clutch is engageable again by pivoting the lever 10q rearwards so that the plate 10s is clear of the frame plate 1n and the yoke 10g is returned by the spring 10t.

A partial depression of the yoke 10g releases the clutch and a full depression locks it in disengaged position.

The primary timing shaft 9 through appropriate intermediate mechanism effects certain mechanical movements which take place once for each tying operation, and other movements hereinafter described, and drives a secondary timing shaft 11 through a ratchet mechanism hereinafter described in such a way that the secondary timing shaft executes one turn for forty-eight turns of the primary shaft, said secondary timing shaft effecting certain of the movements which are not carried out once for each tying operation. A complete rotation of the shaft 11 corresponds with the complete loading of a given stick.

Referring to Figures 4, 5 and 7, a connecting rod 14 extends rearwards from a crank-pin 13 on a crank 12 on the primary timing shaft and operates ratchet means 15 by which a substantially enclosed transverse shaft 16 is intermittently rotated. Two bevel gears 17 and 17a on the shaft 16 engage bevel gears 18 and 18a on two substantially vertical intermittent driving shafts 19 and 19a which initiate some of the intermittent movements which take place once for each tying operation. The bevel gears 17, 17a, 18 and 18a and the ratchet means 15 run in oil baths, as shown in Figure 7.

The secondary timing shaft 11 is driven from the primary timing shaft 9 by means of an eccentric 20, Figures 8 and 9, an eccentric rod 21 pivoted at its forward end to a lever 22 pivotal on the shaft 11, and a pawl 23 on the lever and which in operation advances a 48-toothed ratchet wheel 24 a distance of one tooth per revolution of the primary timing shaft 9. A holding pawl 25, spring-loaded at 25a, prevents return of the ratchet wheel, and to further control free movement of the secondary timing shaft 11 a friction disc 26 carried by the framework resiliently engages one face of the ratchet wheel.

Conveyor means, comprising two leaf conveyor roller chains 27 and 27a, Figures 2, 7, 10 and 16, are located, one at each side of the machine, at a height of for example about 56 inches from the ground, and are guided and driven by sprockets 28 and 28a secured on the vertical intermittent driving shafts 19 and 19a, and also pass around guiding sprockets 29 and 29a and guiding jockey sprockets 30 and 30a supported from the frame. The lengths of the chains 27 and 27a are such that each leaf conveyor chain makes a complete revolution for forty-eight turns of the primary timing shaft or one turn of the secondary timing shaft.

Leaf gripping means 31 and 31a on the outer sides of the leaf conveyor chains consist of releasable clips which releasably hold bundles of untied leaves as they are attached thereto by hand with the stalks uppermost, and convey them to the necessary proximity to the stick for loading thereon.

Referring particularly to Figures 11, 22 and 23, each leaf clip consists of a U-shaped member made by bending a wire to form curved upper and lower parts 32 connected at 32a and 32b so that the upwardly projecting stalks 33b of the inverted bundles of tobacco leaves 33 (Figures 22 and 23) can be placed in the hollow 33a of said member. On the other side of the machine the leaf clips are modified so that the U-shaped members face in the opposite direction.

The leaves are held in the hollow 33a by means of a gripping plate 34a on a gripping bar 34 hinged at 35 to the clip so that the said bar can be hinged inwards between the two parts 32 towards the hollow 33a to grip the leaves, and outwards to release the leaves.

The bar 34, which has a loop 34c for hand opening when desired, is spring-loaded at 36 to hold it closed.

Releasable tripping means for holding the bar 34 open, and releasable by the insertion of leaves in the hollow 33a, comprise a step 34b on the bar 34 near its pivot and engaged by a coacting step 37b in a releasing or tripping bar 37, spring-loaded at 37a and one part 38 of which enters between the two parts 32 of the U-shaped member at the deepest part of the hollow 33a, so that pressure applied thereto by the leaves when inserting them in the clip actuates the releasing bar against the resistance of the spring 37a to release the gripping bar 34 which then moves under spring influence to grip the leaves. The travel of the releasing bar 37 is limited by a stop 37d.

The various parts of the clip are mounted on a plate 39 welded or otherwise secured to a side of one of the chain links and so arranged that in the inner lay of the chain the bar 37 is towards the front of the machine. The pins of the chain link are shown at 39a.

To the gripping bar 34 of each clip is mounted an upright pin 40 carrying a roller 40a engageable by releasing means hereinafter described as the clip passes around the sprocket 29 or 29a to open the gripping bar and release the leaves after tying. The rapid change in direction of the chain after the bundles are released avoids fouling of the clips with the tied bundles.

The arrow 31b in Figure 11 indicates the path of the clip around the sprocket 29a, the arrow 34d indicates the direction of pivotal movement of the gripping bar, and the arrow 37c indicates the direction of pivotal movement of the releasing bar 37.

The sprockets 29 and 29a are rotatable about eccentric journals on rotatably adjustable shafts 29b and 29c, Figure 10, close to the outlet from the stick tube 1e. Pivotal adjustment of the shafts adjusts the clearance between the leaf clips and the stick A emerging from the tube about level with the clips.

On each chain there are twenty leaf clips evenly spaced a distance apart equal to one twenty-fourth of the length of the chain and thus grouped together with a considerable distance between the beginning and end of the group, and as the leaf conveyor chain moves intermittently forty-eight times in each cycle there are extra chain movements before any bundles are brought into position for tying, and after the last bundle has been tied. This allows extra time for other movements hereinafter described.

The leaf conveyor chains convey the bundles to the stick in such a way that they are staggered at opposite sides of the stick, to suit the method of tying, the bundles being tied alternately from each chain. Each chain has two advancing movements for each tying operation relative to that particular chain, not counting the extra chain movements above referred to.

A number of clips are accessible at all times on both sides of the machine, which enables a number of operators to keep each chain loaded and minimises the chances of clips being missed.

The stick magazine 1b which with stick feeding means hereinafter described is shown in Figures 12 to 16, comprises an upright channel 42 acting as a vertical guide for the forward ends of the sticks, and an upright channel 43 acting as a vertical guide for the rear ends of the sticks which are stacked one over the other in the magazine, said sticks being mechanically fed in succession from the magazine at the properly timed intervals.

One side 43d of the channel 43 is hinged at 43a and provided with a handle 43b and spring-loading means 43c (Figure 13) to facilitate the side insertion of the sticks.

The stick feed comprises four interacting mechanisms—namely, a stick selecting mechanism, a stick kick-through mechanism, a stick synchronising mechanism, and a roller feed mechanism, the stick selecting mechanism being adapted to take the weight of the upper sticks off the lowermost stick so as to facilitate its feeding from the magazine, and allowing clearance for bent sticks.

The stick selecting mechanism is constructed as follows:

Referring to Figures 4, 12, 13 and 16, on an upper extension of the shaft 19 is a small sprocket 44 driving by a chain 45 a large sprocket 46 associated with a horizontal stick selector cam 47 in front of the stick magazine. In the cam 47 is a cam groove 47a, Figures 12, 13 and 16, engaged by a roller 47b carried by a transverse lever 47c pivoted at 47d to the framework, and coupled by a connecting rod 48 to a yoke 49, Figures 12 and 13, having its rear forked ends pivotally attached about midway along two dependent levers 50 pivoted at their upper ends at 50a to pivots projecting from the sides of the front upright channel 42.

The lower ends of the dependent levers 50 are pivoted to the rearwardly projecting side arms 51a and 51b of a front selector 51 which thus swings about the pivots 50a. The front selector is kept substantially horizontal throughout its swing by coupling shafts 51c hereinafter referred to.

The front upright channel 42 is slotted across its front, and for a distance back along its sides at 52, and the front selector has a front connecting part 51d which at its inner position is disposed in the slot 52 to support one end of a stack of sticks.

Below the connecting part 51d of the front selector the front upright channel carries a transverse roller 53 which at the appropriate time supports the front end of a stack of sticks in the magazine. The connecting part 51d of the front selector at the appropriate time pushes the lowermost stick off the roller so that it drops to the bottom of the magazine ready to be ejected through the opening 54, Figure 13.

The front selector 51 is connected by the coupling shafts 51c to a rear selector 55 consisting of a dependent member 55a pivoted at 55b to the rear upright channel 43 and with a forwardly projecting toe 55c at its lower end acting through an opening 43e at the rear of the channel near the bottom of the magazine. The rear ends of the coupling shafts 51c are longitudinally slotted at 56 to engage pins or rollers 56a projecting from the sides of the rear selector, the slot allowing a predetermined amount of lost motion, the necessity for which will be apparent from the following description.

Below the rear selector, a retractable stick rest 57 slides in bearings 57a and has a tongue 57b which enters the rear of the magazine when desired to support a stack of sticks, and which when desired is retracted so as to release the stack so that the lowermost stick will fall preparatory to being ejected.

The rear retractable stick rest has a sideways projecting pin 57c (Figures 13 and 14) engaged by the rear end of a stick-rest actuating shaft 57d pivoted at its forward end to the lower end of a lever 57e pivoted at 57f to the frame and having at its top a roller 57g engaged once every cycle by a cam 58 on the lower face of the cam 47. The shaft 57d is actuated rearwards by engagement of the blunt face of the cam 58 on the roller once every cycle, and is actuated forwards suddenly by a spring 57h when the cam disengages the roller.

The groove 47a in Figures 12, 13 and 16 is stepped at 47e so as to cause a slight rearward movement of the selectors and a consequent easing of the end pressure on the stick being selected, so that it can drop at the appropriate time.

The stick kick through mechanism is constructed as follows:

Referring to Figures 13 to 15, a roller 60 is carried eccentrically by a disc 59 on the secondary timing shaft 11.

A lever 61 is dependent from a pivot carried by a bracket 62 on the frame above the secondary timing shaft, and the rounded lower end of the lever 61 is acted upon by the roller 60 once each revolution of the secondary timing shaft, to cause the lever to swing rearwards.

A connecting rod 63 pivoted at a distance above the lower end of the lever 61 extends rearwards and upwards and is pivoted at 64 to a shaft 65 slidable horizontally in bearings 65a and 65b carried by the stick tube 1e, the shaft 65 and lever 61 being actuated forwards by means of a tension spring 65c when the roller leaves the lower end of the lever 61.

A rear connecting rod 66 is pivoted to the rear end of the slidable shaft and extends rearwards and is pivoted to adjustable connecting means 66a carried by a stick kick through member 66b. The latter member has a shank part 66c slidable in bearings 66d below the magazine floor 66e, and an upward projection 66f projecting upwards through a slot 66g in the magazine floor and having a substantially vertical front face 66h which engages the rear end of the lowermost stick when appropriate and under influence of the spring 65c drives its front end forwards through the magazine opening 54, Figure 13.

The shank part 66c carries resilient means 66i.

A handgrip 66j projects downwards from the connecting rod 66 for manually feeding the lowermost stick from the magazine when desired.

The roller feed mechanism is constructed as follows:

Referring to Figures 4 and 16, upper and lower serrated rollers 67 and 67a above and below the centre-line of the stick tube 1e and at the entry end thereof are geared together by gears 68.

The upper roller 67 is carried by bearings 69 and 69a secured to the framework, while the lower roller is carried by a fork 70a at the rear end of a lever 70 pivoted at 70b to a fixed bracket, the forward end of the lever 70 being longitudinally slotted and pivoted at 70c to a lever 71 pivoted at 71a to the frame, with a tension spring 72 normally holding the lower roller against the stick, and providing the necessary feeding pressure. The downward movement of the roller 67a is limited, to keep the gears 68 in mesh, by means of an adjustable stop 67b on the lever 70 and engageable with the frame.

The feed rollers are intermittently driven to intermittently feed the sticks through the machine, by the following means.

A crank and crankpin 74 on the primary timing shaft 9 (Figure 4) are coupled by a connecting rod 75 to a bellcrank lever 76 connected in turn by a connecting rod 77 to a pawl lever 78 pivoted on the axle of the upper roller 67 and carrying a pawl 79 which under the influence of gravity coacts with a ratchet wheel 80 by which the upper roller is intermittently driven on reciprocation of the connecting rod 75. A weighted non-return pawl 81 prevents return of the ratchet wheel 80.

For inserting the first stick into the machine and adjusting its position according to the timing of the rest of the machine, the feeding pressure applied to the lower roller is manually releasable from the front of the machine by means of a handle 71b on the lever 71, and from the back of the machine by means of a rearwardly projecting hand lever 82 pivoted at 82a to the framework and connected by a connecting rod 82b to the lever 71.

Downward operation of the handle 71b releases the feed pressure.

To enable the stick feed to be automatically synchronised, the roller pressure is releasable automatically once each loading cycle, by the following means:

To the secondary timing shaft 11 is fixed a striker arm or cam 83 which, once every revolution, strikes a roller 84 at the forward end of a rocking lever 85 pivoted at 86 to the framework and pivoted at 87 to the lower end of a connecting rod 88 the upper end of which is pivoted at 89 to the lever 71 in front of the pivot 71a. At the appropriate time for synchronising the stick feed, as hereinafter described, the striker per medium of the roller 84, rocking lever 85, connecting rod 88 and lever 71 releases the feed pressure.

Each stick, after being ejected from the magazine, is fed between the feed rollers 67 and 67a and passes through the stick tube 1e, and has leaves loaded onto it as it progressively emerges from the tube which supports it during loading.

The sticks are fed in succession from the magazine, and the stick being loaded, having left the feed rollers 67 and 67a, is fed through the tube by end pressure from the next stick passing between the rollers.

The stick feed synchronising mechanism is constructed as follows:

Referring to Figures 5, 8, 9 and 16, a groove 91 of a cam 90 on the secondary timing shaft 11 is engaged by a roller 92 on the rear end of a lever 93 fixed to a bevel driving gear 94 on a transverse pivot 95 and in engagement with a bevel driven gear 96 on a vertical pivotal shaft 97.

A lever 98 on the pivotal shaft 97 is connected by a transverse connecting rod 99 to the outer end of a forwardly projecting lever 100 fixed to a vertical shaft 101 pivotally carried by the frame.

Referring to Figure 16, a lever 102 fixed on the shaft 101 pivotally carries an apertured slide 102a which on reciprocation of the shaft 101 slides back and forth along a shaft 103 forming an extension of a lever 104 mounted at 105 on a vertical pivot carried by the frame. A stick stop arm 106 on the lever 104 at the opposite side of the pivot 105 has at its forward end a stop 107. When the roller 92 (Figures 8 and 9) is at the bottom of the groove 91, the stop 107 is in front of the stick tube 1e, the feed roller pressure is automatically released and the stick kick through mechanism is operating under spring influence to drive a stick from the magazine.

The stick synchronising mechanism ensures that each stick is in the correct forward position preparatory to loading, and that after loading it is correctly disposed opposite to the stick removal chains. This allows a degree of variation in the stick lengths, without affecting the timing of the machine.

A front roller 108, Figures 28, 29 and 32, spring loaded at 110, and located at the front of the stick tube, bears on the top of the stick and holds it downwards towards a platform 109 (Figure 4) below the stick, to facilitate the stapling operation hereinafter described.

The guide-way for the carriage comprises an inverted T-section top member 111 (Figure 3) the side flanges of which form runways for the carriage rollers or wheels hereinafter described.

The carriage 3 supports the forward end of each stick when it projects beyond a predetermined distance from the outlet from the stick tube 1e, and is constructed as follows:

Referring to Figure 3, to two upper substantially horizontal members 112 and 112a are secured short axles 113 and 114 carrying rollers or wheels 115 and 116 above and below the member 111.

Referring to Figures 3, 18 and 19, two dependent braced members 117 and 117a at the forward end of the members 112 and 112a carry at their lower ends locating means supporting the forward end of the stick.

The locating means consist of a rearwardly facing cup 118 with one side 119 pivoted at 120 and spring-loaded at 121 so that it will open as shown in broken lines in Figure 19 to allow the end of each loaded stick to be withdrawn to the side.

The bottom 122 of the cup is also pivotal about the axis 123, as shown in broken lines in Figure 18, and is integral with an upright plate 125 against which the stick abuts and from which a stop 124 projects forwards to engage a suitable member to limit dropping of the bottom 122. Even with a slightly warped stick the end of the stick will engage on the bottom 122 and forward movement of the stick causes it to ride up the slope of the said bottom so that its end engages the plate 125 after which the bottom 122 is brought horizontal at the correct height for subsequent withdrawal of the stick.

To prevent or minimise sideways movement of the carriage as the sticks are being removed to the side, referring to Figures 3 and 18, a member 126 extends forwards from the dependent members 117 and 117a and is adapted to enter a narrow gap between two laterally spaced guides 127 extending rearwardly from the front pillar 128 of the framework.

The carriage is advanced between tying operations by the pressure of the stick being loaded, and. is returned after removal of each loaded stick by means of a wire, cable or the like 129, Figure 17, passing along the machine and guided by pulleys 130, 131 and 132 and having suspended at its rear end a weight 133, Figure 7, within a guide tube 134.

The weight, per medium of the wire, cable or the like 129, returns the carriage rearwards at the appropriate time, and holds it against the end of the next stick as it is advanced beyond a predetermined position.

Means are provided to hold the carriage at its forward position after each loaded stick is removed, until the stick is sufficiently clear of it to avoid "stripping" of the tobacco by the carriage returning close to it, said holding means being releasable as hereinafter described after the stick has moved aside a sufficient distance so that the carriage will return to a suitable position so that the advancing forward end of the next stick will enter the cup.

The means to hold the carriage at its forward position after each loaded stick is removed comprises a pawl 135, Figure 3, having a plurality of ratchet teeth on its under side, and pivoted at 136 to the front pillar and adapted to coact with the upper edge of a plate 137, Figure 18, associated with the carriage.

The tying mechanism is constructed as follows:

Referring to Figures 16, 20 and 21, a tying head is provided comprising a vertical hollow spindle 138 carried in bearings 139 in a block 140 above the stick and just in front of the outlet from the stick tube 1e, said hollow spindle carrying a fixed pinion 141 rotatable by a rack 142.

At the lower end of the hollow spindle 138 is fixed a tying member 143 having an eccentric vertical tying finger 144 with reinforcing webs 144a.

The upper part 143a of a string passage through the tying member 143 is inclined so as to terminate on the outer periphery of the upper part 143b of the tying member, while the passage 143c through the tying finger 144 is substantially vertical which facilitates threading and minimises friction on the string or any other suitable binding means.

The inclined shape of the edges of the webs ensures that there is a minimum of interference with the upwardly projecting leaf stalks. The webs also prevent the string from becoming caught on the finger 144 during tying.

A container 145 has a central holding peg 145a (Figures 1 and 4) for a ball of string, and tensioning means 146, Figure 20, are provided to which the string is taken from the container per medium of apertured guides 145b (Figure 17), 145c, 145d and 146a (Figure 20). From the tensioner, the string passes through an apertured guide 146b to the tying member 143.

The block 140 guides the rack 142 which is held against the pinion 141 by a spring 147, plunger 148 and a spring-loaded roller 148a, which is held resiliently against the rack while permitting its oscillation. The rack teeth can slip relatively to the pinion teeth should the tying member become jammed, so as to prevent or minimise damage. The tying member can be readily adjusted on moving the rack away from the pinion.

The block 140 has side extensions 149 and 149a passing through bearings 150, to permit transverse reciprocation or traversing of the block, tying member, rack and pinion, and said extensions enter two oppositely disposed centraliser barrels 151 containing two springs 152 acting on the ends of the extensions 149 and 149a to tend to centralise the tying head over the stick emerging from the stick tube 1e. The centralising effect is adjustable at 152a.

The longitudinal movement of the rack 142 to spin the tying member and the traverse of the block 140 and tying member 143 are applied thereto as follows:

Referring to Figures 4, 5, 8, 9, 16, 24 and 25, a bevel gear 153 on the primary timing shaft 9 engages a bevel gear 154 on a vertical shaft 155 driving a grooved disc cam 156 on an upper extension shaft 155a driven from the shaft 155.

The groove 156a in the cam 156 is engaged by two rollers 157 and 158. The roller 158 (Figure 16) is on an oscillatable transverse double-ended lever 159 the end 160 of which is connected by a forwardly projecting connecting rod 161 to one arm 162a of a bell-crank lever 162 the other arm 162b of which engages a pin 163 on the block 140, so that oscillation of the bell-crank lever 162 causes transverse oscillation of the block 140 and tying member 143.

The other roller 157 is at the rear end of a lever 164 on a vertical shaft 165 carrying a transverse lever 166 slotted at its outer end to engage a pin 167 on a longitudinal guided shaft 168 to which the rear end 142a of the rack 142 is pivoted to allow for traversing of the block 140 and rack pinion 141.

The cam 156 is designed to give the necessary speed of movement followed by the necessary pauses.

During each of a number of selected chain movements the tying means are traversed to the opposite side of the stick, the tying occurring alternately at opposite sides of the stick. The cam 156 is designed and adjusted so that after each bundle of leaves is brought into position the traverse of the tying head is completed and the cam causes the rotation of the tying member in one direction so as to wind the string twice around the upper ends of the stalks, the tying movement being alternately in opposite directions. The above timing ensures against damage of the leaf by the traverse of the tying finger.

The direction of rotation of the tying member is such that the string in engaging the leaves tends to draw them inwardly over the stick, while after each tie the string pulls backwards away from the neatly tied bundle. As will be clear from Figure 32, this, together with the forward movement of the stick, applies a desired tension to the string and ensures a secure tie.

The traverse of the tying means after tying tensions the string holding the newly tied bundle.

Leaf guides to push the leaves in towards the stick and prevent them tipping over while being tied, comprise spring steel plates 169, Figures 22 and 23, secured to opposite sides of the framework and with their curved forward ends 169a beneath the loading chains and almost below each tying position. The leaf guides are actuable inwards by pins 170 dependent from the front sprockets 29 and 29a, and engaging cam plates 169b carried by the plates 169 which are adapted to spring back to engage with resilient buffers 171 on the frame. Before each bundle of leaves is tied the appropriate leaf guide presses it inwards just below the stick for the above purpose.

Automatic clip releasing means for opening or releasing each leaf holding clip after the bundle which it carries has been tied and as the chain and stick move forward again and the traverse of the tying means commences, are constructed as follows:

Referring to Figures 10 and 11, to the upper ends of the front chain sprocket shafts 29b and 29c, above the sprockets, there are secured pivotally adjustable cam members 172 and 172a each consisting of a top plate 172b securable to the shaft 29b or 29c and with a dependent cam part 41 or 41a coacting with the roller 40a carried by the gripping bar 34 of the leaf clip, to pivot the bar outwardly just after tying so that the bundle is no longer held by the bar against the support constituted by the upper and lower parts 32 of the leaf clip. The bar 34 is reset and locked in open position by the step 37b engaging the step 34b on the releasing bar 37.

The leaf conveyor-chain advances more rapidly than the stick, so as to get the leaves rapidly into position and to get the clips rapidly out of the way when the bundles are tied.

A tying head dog clutch 173, Figures 24 and 25, is located in the vertical drive to the cam 156, between the shaft 155 and the extension 155a. The clutch is disengageable to stop the tying operations after each lot of bundles has been tied and before the next stick is loaded with bundles, and is engageable at only one point in its rotation.

The actuating means for the dog clutch releasing means comprise a cam 174 (Figure 4) on the secondary timing shaft 11 and engaging a roller 175 on the front end of a lever 176 pivoted at 177 to the framework and pivoted at its rear end to the lower end of a vertical connecting rod 178 the upper end of which is pivoted to a transverse lever 179 (Figure 25) pivoted at 180 to the framework and the forked opposite end of which actuates the clutch 173. When the cam 174 actuates the roller 175 the clutch is disengaged.

The stapler 4 is provided for stapling to the stick the string by which the leaves are tied at about the beginning and end of each stick.

Referring to Figure 4, for primarily timing the stapling operations, a cam 181 on the secondary timing shaft 11 has two lobes 181a and 181b spaced apart according to the desired timing of the stapling operations. The lobes coact with a roller 182 on one end of a lever 183 pivoted at 177 to the framework, and the other end of which carries the fulcrum 184 of a lever 185 for actuating the stapler 4. Stop means 187 limit the movement of the roller 182 towards the shaft 11.

A hardened shoe 188 at one end of the lever 185 is actuated by a striker cam 189 on the primary timing shaft 9. At the opposite end of the lever 185 is pivoted the lower end of an upwardly projecting connecting rod 190 pivoted at its upper end to a lever 191 pivoted by its rear end 191a to the framework.

The lever 191 is pivoted to a dependent connecting member 192 which is apertured to clear the carriage guide rail 11 and the front of the carriage. The member 192 is pivoted at or near its lower end to a staple striker arm 193, Figures 3 and 4, pivoted forward of the stapling position to a stapler shaft 194 pivoted at its forward upper end at 194a to the frame. The striker arm is connected to the framework above by two tension springs 186, Figure 3, at opposite sides of the stapler.

The springs 186 keep the shoe 188 towards the striker 189, and keep the roller 182 towards the cam 181. On the striker engaging the shoe the lever 190 is driven vertically.

The stapler striker arm 193 extends rearwards beyond the point of attachment of the connecting member 192 and is pivoted to a stapler striker 195, Figures 26 and 27, which is vertically actuable in guide slots in a stapler head 196 at the rear end of the stapler shaft 194.

The stapler shaft 194 forms a housing or magazine holding for example about 900 to 1,000 staples 197 which may be of the type known as "Bostitch" staples. The magazine extends towards the front of the machine, and the staples are fed to the stapler head 196 by means of a slide 198 loaded by means of a cord or the like 199, Figures 3 and 17, passing over pulleys 200 and 201 carried by the frame and a pulley 202 carried by the stapler shaft 194, Figure 3, said cord or the like being loaded by a weight 204, in a guide tube 203.

The upward movement of the staple striker 195 is suitably limited and the front end of the stapler striker arm 193 is slotted to compensate for its arcuate movement.

The stapler is guided in its arcuate swing by a guiding yoke 4a.

The means for driving the staples consist of a hardened part 205 which on impact of the stapler head with the stick presses on the head of the foremost staple and drives it downwards into the stick, with one prong on each side of the string. One of the staples is shown driven at C, Figures 20 and 32.

Side projections 206 on the stapler shaft 194 are engaged by the stapler driving arm 193 to prevent rebound of the stapler shaft during stapling.

Each stick is supported during stapling by the platform 109, Figure 4, at the front of the tube 1e. Where the stick leaves the tube it passes between, and is gripped by, two spring blades 208, Figure 10, extending beyond the front end of the tube 1e, but not so far as the end of the platform 109.

The construction is such that when the cam lobes 181a and 181b are not in engagement with the roller 182 on the lever 183, the lever 185 cannot be acted upon by the striker 189 engaging the shoe 188. At the desired intervals the appropriate lobe 181a or 181b lifts the roller 182 so that, at the appropriate time the striker 189 engages the shoe 188 and causes the stapler to be depressed forcibly to staple the string to the stick at the beginning and end of each series of tying operations.

The member 192 has a hand-grip 192a, Figure 3, for manually driving the first staple when commencing operations.

String guiding means to guide the string during stapling are constructed as follows:

Referring to Figures 28 and 29, a slide 209 is slidable in bearings 210 and 211 carried by the framework, and at one side of the stick tube 1e, towards its outlet end, and is parallel with the inner lay of one of the leaf conveyor chains. On the slide is an upward projection 212 carrying a post 213 engaging in a slot 214 in a lever 215 pivoted over the stick tube 1e and with the curved outer end 216 of the lever disposed across and above the inner lay of the leaf conveyor chain which passes through the gap 217, Figure 29. To the forward end of the slide 209 is pivoted at 218 a forward extension 209a having at its forward end a preferably resilient horizontal plate 219 disposed above the stick and in front of the stick tube 1e, with an inclined flat finger 219a projecting upwards from the plate 219. The extension 209a is held towards the stick tube by a spring 220 and has a projection 221 coacting with a cam 222 which on reciprocation of the slide 209 and extension 209a causes the finger 219a to follow a course from behind the tying head to the front thereof, so that the string engages beneath the finger 219a which travels around the finger 144 clear of the same.

The leaf conveyor chain 27a carries an upwardly projecting post 223, Figures 10, 28 and 29, adapted to engage the lever 215 so that the advancing of the chain also advances the string guide with the result that the finger 219a holds the string ahead of the tying finger 144 and in such a direction that the staples will be driven properly across the string between the tying finger 144 and the finger 219a.

A spring 224 returns the slide 209 when released by the post 223, the travel of the slide being limited at 209b.

A downward projection 207 on the plate 219 in use slides along the side of the stick as the string guide is advanced, so that the finger 219a travels substantially medially along the stick, except when passing around the tying finger 144.

The string guiding means operate just prior to the stapling of the string to the stick after loading. When the first staple of the next stick is driven the string is held in place by the last staple of the preceding stick, and the string guiding means are not then necessary.

During stapling, the tying member is substantially central over the stick and in front of the string guide fingers 219a, with the tying finger 144 rearward, so that the string is pulled backwards away from the newly-tied bundle, to ensure a secure tie. To bring about these conditions, on the dog clutch 173 disengaging, the tying member is held in its intermediate position by the centralising springs 152 in the centraliser barrels 151, Figures 20 and 21.

The chain post 223 is supported by a guide rail 223a Figure 29, against tipping due to the side thrust imparted by the lever 215. The projection 212 is similarly supported by guide rails 212a and 212b.

Tying cam locking and releasing means to lock the tying cam 156 in the position corresponding with the intermediate position of the tying head are constructed as follows:

Referring to Figures 24 and 25, a transverse locking bar 225 passing across the tying cam 156 is pivoted at 226 to an upright bracket 227 on the clutch releasing lever 179, the pivot 178a being at the outer side of the pivot 226.

The opposite end of the locking bar 225 passes through a slot 228 in a plate 229 attached to the frame and which forms its fulcrum under certain conditions.

The locking bar 225 is held down by a spring 230 and carries a dependent dog 231 coacting with a notch 232 between a ramp 233 and a stop 234 both of which are on the cam 156, to lock the cam in such a position that the tying finger 144 stops in the correct place for stapling the string.

Referring to Figures 8, 9, 30 and 31, a cam 235 on the secondary timing shaft 11 intermittently engages a roller 236 on a lever 237 pivoted at 238 to the frame and having its outer end connected by a connecting rod 239 to a transverse lever 240 pivoted at 241 to the frame. A bracket 243 carried by the lever 240 is pivoted to the forward end of a releasing lever 244 fulcrumed at its rear end to the frame and passing beneath the outer end of the locking bar 225.

As long as tying is to be carried out, the clutch 173 is engaged and the pivot 178a is as shown in Figure 25, so that the dog 231 is at the outer side of the notch 232. At the end of each series of tying operations, the clutch 173 is disengaged by action of the cam 174 through the members 176, 178 and 179 and the arcuate movement of the pivot 178a transversely actuates the locking bar 225 so that the dog 231 moves into the circular path of the notch 232.

When the tying finger 144 is in the appropriate rearward position over the stick and the tying member 143 is over the stick, the dog 231 which has climbed the ramp 233 drops into the notch 232 and locks the tying mechanism.

The dog 231 is later released by the cam 235 acting on the roller 236, which lifts the lever 244.

String cutting means, for cutting the string after each loaded stick has been removed sideways clear of the front of the stick tube 1e following the driving of the first staple in the next stick, are constructed as follows:

Referring to Figures 8, 9, 30, 31 and 32 the transverse lever 240 engages beneath a lever 245 (Figure 30) pivoted at 246 to the frame above and ahead of the front of the stick tube 1e, and a little to the side. The lever 245 extends forwards and downwards beyond the pivot, to pivotally carry a forwardly projecting knife 247 with an upwardly facing blade 248. The blade is depressed by the above linkage, and flies upwards under influence of the spring 249 when the cam 235 leaves the roller 236, to cut the string B.

The knife pivot 250 enables the knife to pivot upwards and slide freely over a slide 251 carrying a weighted pick up pawl 252 of stick removal means hereinafter described, as the lever 245 is actuated from the cam 235.

The stick removal means, which remove the fully loaded sticks sideways from in front of the stick tube 1e, are constructed as follows:

Referring to Figures 5, 8, 9, 16, 32, 33 and 35, a lever 253 on the pivotal shaft 97 in the drive to the stick stop arm 106, is connected by a connecting rod 254 to the transverse slide 251, Figures 16, 32 and 33, which slides in guides 255 and 255a and carries the weighted pick-up pawl 252 which in one direction of movement of the slide 251 slides across underneath the rear end of the stick A on which the tying has just been completed and in its reverse movement draws the stick sideways away from the front of the stick tube 1e and up a ramp 256 from which it is pushed by one of a series of lugs or posts 257 projecting from a primary stick removal chain 258 running on sprockets 259 and 260 carried from the frame. The sprocket 260 rotates with a sprocket 261 driven by a chain 262 from a sprocket 263 on a longitudinal transmission shaft 264, Figure 16, supported in bearings 265 and 266 and driven by a bevel drive 267 from the intermittent shaft 19a. An upwardly projecting stop 268, Figure 23, at one side of the platform 109, ensures that the advancing slide 251 will not push the stick off the platform.

A stop 252a on the slide 251 limits pivoting of the pick-up pawl 252.

Referring to Figures 5, 16 and 35 at the front of the machine a similar weighted pick-up pawl 269 is provided for picking up the forward ends of the loaded sticks, its slide 270 being actuable from the mechanism actuating the slide 251 by a linkage comprising a lever 271, Figures 5 and 35, secured to the shaft 97 and connected by a connecting rod 272 to the outer end of a lever 273 on a vertical shaft 274 carried from the frame. The shaft 274 has secured to it a lever 274 (Figure 16) pivotally connected by a connecting rod 275 to the slide 270, which slides in suitable guides.

At the front of the machine, a primary stick removal chain 277 running on sprockets 278 and 279 is arranged and functions similarly to the chain 258. The sprocket 279 (Figure 35) turns with a sprocket 280 driven by a chain 281 driven in turn by a sprocket 282 at the front end of an extension 264a driven through a universal joint 264b and demountable coupling 264c on the front end of the transmission shaft 264.

Fixed guides 283 and 284 guide the ends of the loaded sticks as they are conveyed away from the front end of the stick tube 1e.

The stick removal extension 1d, Figures 2, 16 and 33 to 37, forms the main part of a magazine for the loaded sticks, said extension extending sideways for a convenient distance and freely supporting the sticks and conveying them slowly away from the primary chains 258 and 277 until they are manually removed when convenient for loading into the drying kiln.

The stick removal extension has a detachable framework coupled at 285 and 286 by releasable thumb-nuts to the machine frame. Referring to Figures 16 and 33 to 37, pivoted slotted plates 287 and 288 on the machine frame are secured on studs projecting from the stick-removal extension by wing-nuts 285a and 286a.

Stick guides 289 and 290 guide the ends of the sticks in their travel along the stick removal extension, and off-set pivoted guide plates 291 and 292 pivoted to the frame can be swung into position to prevent jambing of the loaded sticks as they pass from the guides 283 and 284 to the guides 289 and 290.

The outer end of the framework of the stick removal extension rests on adjustable and removable supports 293 and 294 which are adjustably connected by means of a spacer 295, Figure 34.

Two stick removal extension chains 296 and 297 carried by the stick removal extension receive the sticks from the primary chains 258 and 277 and maintain their spacing.

The chain 296 is mounted on sprockets 298 and 299, the outer sprocket being adjustable to adjust the chain tension, and the inner sprocket 298 having a sleeve part 300, Figure 33, passing through a plate 301 which forms part of the extension frame, and has a retaining ring 302 at its outer side. A keyway 303 inside the sprocket 298 engages a key 304 on the axle 260a of the primary chain sprocket 260, when the secondary chain sprocket 298 is slid thereon.

Securing of the thumb-screws 285a and 286a secures the sprocket 298 to the axle 260a.

The chain 297 is driven and supported in a similar manner, and is adjustable as at 297a in Figure 36.

Carriage release means, to permit the carriage to return to its starting position after a loaded stick has been removed by the stick removal pawls to a position clear of the carriage, are constructed as follows:

Referring to Figures 16 and 35, the outer end of the slide 270, when it approaches the end of its operating stroke, engages the rear end of a lever 305, pivoted at 306 to the frame and pivoted at its forward end to a transverse connecting rod 307 pivoted near the centre of the front of the machine to the lower end of a bell-crank lever 308. The bell-crank lever is pivoted at 309 to the frame and its horizontal arm 309a extends across beneath the carriage pawl 135, Figures 3 and 18, the carriage pawl 135 being thus lifted and the carriage released.

The carriage returns against preferably rubber buffers 310, Figure 4, to a position with the cup 118 ahead of the stick being loaded, so as not to strike the stick at the sides of the machine.

Two pivoted stretcher rests 311 and 312 when not in use are in the positions shown in Figure 1, and can be swung outwards about the pivots 311a and 312a to project outwards, whereupon the extensions 311b and 312b are extensible. The stretcher rests, when extended sideways, support the stretchers on which the leaves are supplied to the machine, and are at a height convenient to the operators when loading the chain clips with leaves from the stretchers.

The string holding means 145 may have a slot to enable the amount of string to be easily gauged.

Referring to Figure 1, at a convenient height above the leaf conveyor chains to gauge the extent of upward projection of the leaf stalks are gauging bars 313 parallel with the leaf conveyor chains.

Locking means 314, Figure 3, enable the carriage to be locked to the upper guide rail 111 during transit.

Inwardly projecting spring steel steadying plates 208a, Figure 10, within the stick tube 1e, steady the stick passing therethrough.

In one embodiment of the invention, each leaf conveyor chain 27 and 27a (Figure 2) has 192 links, with a pitch of ⅝ inch, and with the leaf clips spaced at 8 links intervals. The stick advances about 1.1 inches after each tie. The drive to the cam 47 (Figures 12 and 16) from the shaft 19 has a ratio of 6 to 1, the drive from the shaft 19a to the shaft 264 (Figure 16) has a ratio of 2 to 1, the drive from the shaft 264 to the axle 260a has a ratio of 2¼ to 1, the sprocket 260 has 12 teeth at a pitch of ⅞ inch, the front and rear primary timing chains 258 each has 64 links and carries 4 stops or posts 257. The feed roller ratchet wheel 80 (Figure 4) has 8 teeth and rotates 1 tooth at each operation and the ratchet means 15 (Figures 4 to 7) operate 8 times for each revolution of the shaft 16.

In operation, a supply of sticks and staples are loaded into the machine, and the ball of string is inserted in the container 145, its end being threaded upwards through the guides 145b and 145c (Figure 17) and through the guide 145d and downwards and forwards and through the tensioner guide 146a, the tensioner 146 and the guide 146b and then downwards through the tying spindle 138 and tying member 143, so as to pass freely out of the lower end of the tying finger 144.

The carriage is located at its rearmost position adjacent to the tying head, the motor is started and the drive is engaged to bring the first leaf clips adjacent to the sprockets 19 and 19a.

The clips are now loaded with inverted bundles of leaves from stretchers supported on the stretcher rests, the stalks being arranged to project a gauged distance above the chains. The chains are now advanced automatically until the leaf clips are in the position shown in Figure 10.

By manual operation of the stapler, the string projecting from the tying finger is now secured to the first stick the forward end of which protrudes from the front of the stick-tube 1e and abuts against the stick stop 107 at the end of the arm 106 which is in the position shown in Figure 16.

The clutch 10 is now engaged and the machine continues to function automatically so long as the supply of sticks, staples, string and leaves is maintained.

The leaf conveyor chains, tying mechanism and stick-feed rollers are intermittently actuated. As the inner lays of the chains advance intermittently forwards, the operators place bundles of leaves at about the level of the gauging bars into the clips which are travelling intermittently rearwards at both sides of the machine.

As each bundle after travelling rearwards and then forwards through the machine reaches an appropriate position, close by the stick and in front of the tube 1e, with the upper ends of the stalks at one side of the stick and projecting upwards thereabove, the tying member is rotated twice by the rack and pinion mechanism so as to twist the string twice around the stalks above the stick. For each subsequent bundle the tying means are traversed to the opposite side of the stick. After each bundle is tied it is released and the feed rollers advance the stick an appropriate distance for the next tying operation, the leaf conveyor chains being simultaneously advanced. The advancing of the stick attains the desired spacing of the bundles and keeps a desired tension on the string or the like.

After the first few ties have been made, the forward end of the stick engages in the cup of the carriage which is propelled forwards by the pressure exerted by the stick.

When the stick is fully loaded with bundles, the tying automatically stops, the string guide operates, the string is automatically stapled to the stick, the first staple is driven into the next stick, the completed stick is moved to the side by the pick-up pawls and while the carriage is held in its forward position, the string is cut. The bundles are now suspended from the stick by the string.

The next cycle now commences.

At an appropriate time in each cycle, the carriage is released again and returns to its rearward starting position.

After each stick is removed to the side, by the pick-up pawls, it is engaged and intermittently conveyed away to the side by the chains 258, 277, 296 and 297 to make way for subsequent sticks. At intervals the sticks are removed manually for loading into the kiln, and the stick magazine and if necessary the staple magazine, is replenished.

After the first stick has been loaded, both staples in subsequent sticks are driven automatically.

The main movements carried out for each racking movement of the ratchet drive to the secondary timing shaft are substantially as follows, assuming that at least one stick has already been loaded with leaves:

*First move of the ratchet drive.*—The leaf conveyor chains 27 and 27a advance to the positions shown in Figure 10, to bring the first clip into position on the side of the machine remote from the stick removal extension. The stick stop arm 106, Figure 16, which has already been partially advanced is fully advanced to bring the stop 107 in front of the stick tube 1e. At the same time it pushes the rear end of the last completed stick sideways towards the disposal position a distance of about half an inch, leaving it a degree of end contact with the stick about to be loaded.

The cam 235, Figure 30, lifts the lever 244 so that the dog 231 on the tying cam lock bar 225 will drop into its lower position. The stick pick-up pawls 252 and 269, Figures 16 and 32, reach their fully extended positions. The string cutter 247, Figures 30 and 32, reaches its lowest position. The cam 83, Figure 4, on the secondary timing shaft 11 releases the feed pressure on the stick to be loaded. Shortly after this, the magazine kick through mechanism operating under spring tension drives the next stick forward and thus advances the stick about to be tied so that it engages the stick stop 107, Figure 16. Consequently the last completed stick is driven by end pressure to the limit of its forward travel. The stapler lobe 181b of the stapler timing cam 181, Figure 4, and roller 182, and the cam 189 actuates the stapler to secure the string to the stick. The tying head then traverses from over the stick to one side and ties the first bundle, the tying finger 144 twice encircling the stalks.

*Second move.*—The stick stop arm 106 is withdrawn and the cam 83 (Figure 4) operates to return the lower feed roller 67a to bear against the underside of the next stick. The leaf conveyor chains again advance and the first bundle is released from the clip, the stick being simultaneously advanced by the feed rollers and the tying head traversing to the opposite side of the stick. The stapler timing cam 181 (Figure 4) advances to bring the roller 182 into its lower position, and the second bundle is tied.

*Third move.*—The leaf conveyor chains and the stick advance, the second bundle is released, and the tying head again traverses. The stick pick-up pawls start to take away the previously loaded stick. The string cutter 247 is stationary below the stick being tied and between said stick and the loaded stick which is being removed. The third bundle is tied.

*Fourth move.*—The leaf conveyor chains and the stick advance, the third bundle is released and the tying head again traverses. The pick-up pawls continue to remove the loaded stick. The string cutter moves rapidly upwards under spring influence and cuts the string between the stick being loaded and the stick being removed. During the upward movement of the string cutter the lever 244, Figure 30, lowers the outer end of the stop bar 225 on to the bottom of the notch in the fixed plate 229. The stop bar 225 at this stage does not lock the tying cam. The fourth bundle is tied.

*Fifth move.*—The leaf conveyor chains and the stick advance, the fourth bundle is released, the pick-up pawls continue to remove the loaded stick and the tying head again traverses. The fifth bundle is tied.

*Sixth move.*—The leaf conveyor chains and the stick advance, the fifth bundle is released, the tying head traverses, the pick-up pawls are fully retracted, the carriage release pawl 135, Figure 3, is raised by means of the bell crank lever 308, Figures 16 and 35, to release the carriage which returns to its rearward position ready to receive the front end of the stick being loaded. The sixth bundle is tied.

*Seventh move.*—The leaf conveyor chains and stick advance, the sixth bundle is released, the tying head again traverses, the stick removal chains commence to advance the last completed stick towards the stik removal extension. The seventh bundle is tied.

The advancing movements of the leaf conveyor chains and of the stick and the tying of the bundles and the necessary associated mechanical movements are repeated until the thirty-sixth move of the ratchet mechanism driving the timing shaft 11.

*Thirty-sixth move.*—The leaf conveyor chains and stick advance, the thirty-fifth bundle is released, and the tying head traverses. The upward projection 66f of the stick kick-through mechanism illustrated in Figure 14 commences to travel towards the rear of the magazine. The thirty-sixth bundle is tied.

*Thirty-seventh to thirty-ninth moves.*—In each of these moves the leaf conveyor chains and stick advance, the last tied bundle is released, the tying head traverses and a further bundle is tied.

*Fortieth move.*—The leaf conveyor chains and stick advance, the thirty-ninth bundle is released, and the tying head traverses. The magazine selectors 51 and 55, Figures 13 and 14, commence to advance and the fortieth bundle is tied.

*Forty-first move.*—The leaf conveyor chains and stick advance, the fortieth bundle is released, and the tying head traverses. The cam 174, Figure 4, on the secondary timing shaft 11 coacts with the roller 175 on the lever 176 to disengage the clutch 173. The tying head cam stop bar 225, Figures 24 and 25, moves across so that the dog 231 is in a position over the cam 156, and when the notch 232 reaches the position shown in Figure 24, the dog 231 having climbed the ramp 233 engages the notch and stops the cam. The tying operations are consequently locked, with the finger 144 rearward substantially over the centre of the stick.

*Forty-second move.*—The leaf conveyor chains and stick advance, and the magazine stick rest 57 commences to move rearwards.

*Forty-third move.*—The leaf conveyor chains and stick advance. The post 223 on the chain 27a starts the string guide finger 219a (Figure 29). The stick stop arm and stick pick-up pawls start to approach the loaded stick. The front and rear magazine selectors are fully advanced, causing the front end of the lowermost stick being selected to drop from the front selector onto the magazine roller stop 53.

*Forty-fourth move.*—The leaf conveyor chains and stick advance. The front and rear stick magazine selectors move slightly rearwards, which releases the end pressure of the toe 55c on the stick being selected, to allow the rear end of the stick to drop down onto the magazine floor, the stick kick through mechanism being far enough back to permit this.

*Forty-fifth move.*—The leaf conveyor chains and stick advance, the lobe 181a of the stapler timing cam 181 lifts the roller 182. The string guide is fully advanced. The magazine stick rest 57, Figure 14, is fully advanced. After the leaf conveyor chains and stick have stopped, the stapler is actuated by the cam 189, Figure 4, to drive the staple over the string which is held in place by the string guide.

*Forty-sixth move.*—The leaf conveyor chains and stick advance. The front and rear stick magazine selectors start to move back. The string guide remains stationary and the string cutter starts to move down.

*Forty-seventh move.*—The leaf conveyor chains and stick advance. The front and rear magazine selectors move back. The movement of the front selector causes the stick being selected to fall from the front roller stop 53 onto the floor of the magazine. The string guide returns to its retracted position.

*Forty-eighth move.*—The leaf conveyor chains and stick advance. The tying head cam stop bar 225 is lifted by upward movement of the lever 240, Figure 31. The stick carriage is locked in its forward position by the front pawl 135, Figure 3, so that in the subsequent disposal of the loaded stick to the side, the carriage will not return rearwards prematurely and damage the tied bundles as it passes.

Should the string break, the machine can be stopped and the string can be stapled to the stick, the stapler being manually operated. Alternatively, the ends of the string can be tied together.

A knot or join in the string will pass through the guides and tensioner, which is an advantage when the string is jointed after breakage or when replacing the string with a fresh ball.

The missing of one or two ties in succession does not necessarily involve the failure of the rest of a series of ties.

Using the present invention, four passers (two at each side) may select the leaves from the stretchers and load the leaf clips, and one gang foreman can supervise the machine and gang and remove the loaded sticks from the chains 296 and 297 for loading into the kiln. A greater output can be obtained with six passers.

Because the stick advances with the leaf conveyor chains, even though the linear speeds are not the same, friction between the leaves and the stick is minimised.

The use of the leaf clips and chains for holding and conveying the bundles enables the machine to be operated at a greater speed for the same number of passers than would be possible without such gripping means and chains, as it is not necessary for the passers to synchronise their movements exactly with the operation of the machine, which would necessitate operating the machine at a lower speed to guard against ties being missed.

While this specification refers to the use of string for tying the bundles, any other suitable means may be employed for this purpose.

I claim:

1. A machine for loading bundles of stalked tobacco leaves onto sticks, comprising a succession of readily accessible gripping means for temporarily holding the bundles inverted by the stalks to be manually attached thereto means for automatically progressively advancing the stick to which the bundles are being loaded, means for automatically successively advancing the gripping means and attached bundles to two alternate tying positions in close proximity to opposite sides of the stick in timed relation to the advance of the stick, tying means for automatically tying each bundle of leaves in turn after it reaches its tying position to a string previously secured to the stick, and means to automatically release each bundle from the gripping means after it is tied so that when loading is completed and the string is secured to the stick and the stick is removed the bundles are securely suspended by the string from the stick.

2. A machine according to claim 1, in which leaf conveyor chains are provided arranged at opposite sides of the machine to which the gripping means are attached at intervals and in which each leaf conveyor chain passes around a sprocket adjacent to the tying position and so disposed that as the stick and leaf conveyor chains are advanced after tying of each bundle of leaves and the appropriate leaf gripping means are released the direction of the movement of the chain changes rapidly so as to avoid or minimize fouling of the bundles.

3. A machine according to claim 1, in which means are provided to automatically fasten the string to the stick before and after loading, consisting of an automatically operable stapler operable to drive staples astride the string and into the stick at the appropriate intervals, and in which automatically operable string guiding means are also provided to bring the string into the correct position preparatory to driving the last staple into the stick.

4. A machine according to claim 1, wherein the tying means are operable to stop after each loading cycle so that it holds one end of a part of the string substantially centrally over the stick, and in which string guiding means are provided to hold the other end of said part of the string substantially centrally over the stick, and in which stapling means are also provided adapted to drive a staple over the string between the two points at which it is held.

5. A machine according to claim 1, in which means are provided to automatically fasten the string to the stick before and after loading, consisting of an automatically operable stapler operable to drive staples astride the string and into the stick at the appropriate intervals, and in which automatically operable string guiding means are also provided to bring the string into the correct position preparatory to driving the last staple into the stick, the machine automatically handling a number of sticks in succession and the positioning of the string by the last staple in each completed stick is relied on for the first stapling operation on the next stick which is advanced behind the completed stick.

6. A machine according to claim 1, in which the machine will automatically handle a number of sticks in succession and means are provided for removing each loaded stick to the side after loading, and in which a carriage is provided so that the front end of each stick is adapted to be supported during at least the latter part of the loading operations by means of the carriage which is advanced by end pressure of the stick thereagainst, the carriage being adapted to release the loaded stick when side pressure is applied by the stick removal means, and in which holding means are also provided for holding the carriage in advanced position, said holding means being automatically releasable when the loaded stick is quite clear of the carriage.

7. A machine for loading successive bundles of stalked tobacco leaves onto successive sticks, comprising conveyor means; a succession of individual readily accessible leaf gripping means carried thereby to which the bundles of leaves can be continuously and successively attached by hand while inverted by the stalks, and each adapted to positively grip a bundle, a plurality of the leaf gripping means being accessible simultaneously to facilitate loading; means for driving the conveyor means; means for guiding the conveyor means to bring the gripping means and inverted bundles held thereby into close proximity with alternate sides of the stick being loaded; means for automatically and successively twisting a string around the upwardly projecting stalk ends of the bundles as they reach appropriate positions alternately at opposite sides of the stick; means for automatically releasing the leaf gripping means as the bundles are tied; means for securing the string to the stick before and after loading of the stick; and means for attaining the desired spacing of the bundles along the stick, so that when the stick is loaded the bundles are securely suspended from the one string and at alternate sides of the stick.

8. A machine for loading successive bundles of stalked tobacco leaves onto successive sticks, comprising conveyor means; a succession of individual readily accessible leaf gripping means carried thereby to which the bundles of leaves can be continuously and successively attached by hand while inverted by the stalks, and each adapted to positively grip a bundle; a plurality of the leaf gripping means being accessible simultaneously to facilitate loading; means for driving the conveyor means; means for guiding the conveyor means to bring the gripping means and inverted bundles held thereby into close proximity with alternate sides of the stick being loaded; means for automatically and successively twisting a string around the upwardly projecting stalk ends of the bundles as they reach appropriate positions alternately at opposite sides of the stick; means for automatically releasing the leaf gripping means as the bundles are tied; means for securing the string to the stick before and after loading of the stick; and means for automatically advancing each stick as it is loaded to attain the desired spacing of the bundles and keep a desired tension on the string so that when the stick is loaded the bundles are securely suspended from the one string and at alternate sides of the stick.

9. A machine for loading successive bundles of stalked tobacco leaves onto successive sticks, comprising conveyor means; a succession of individual readily accessible leaf gripping means carried thereby to which the bundles of leaves can be continuously and successively attached by hand while inverted by the stalks, and each adapted to positively grip a bundle, a plurality of the leaf gripping means being accessible simultaneously to facilitate loading; means for driving the conveyor means; a stick magazine for holding the sticks prior to loading; means for automatically ejecting the sticks in succession from the stick magazine for loading with bundles of leaves; means for guiding the conveyor means to bring the gripping means and inverted bundles held thereby into close proximity with alternate sides of the stick being loaded; means for automatically and successively twisting a string from a long length of said string around the upwardly projecting stalk ends of the bundles as they reach appropriate positions alternately at opposite sides of the stick; means for automatically releasing the leaf gripping means as the bundles are tied; means for securing the string to the stick before and after loading of the stick; means for cutting the string between the sticks; means for automatically advancing each stick as it is loaded to attain the desired spacing of the bundles and keep a desired tension on the string so that when the stock is loaded the bundles are securely suspended from the one string and at alternate sides of the stick; means for automatically removing each loaded stick from the loading position; and means for holding a plurality of loaded sticks until they can be conveniently removed from the machine.

10. A machine as claimed in claim 9, wherein each gripping means comprises a support against which a bundle can be held, a spring-loaded bar and tripping means operable by pressure of a bundle when it is inserted in the gripping means to release the bar and cause it to grip the stalks against the support.

11. A machine as claimed in claim 9, wherein each gripping means comprises a support against which a bundle can be held, a spring-loaded bar and tripping means operable by pressure of a bundle when it is inserted in the gripping means to release the bar and cause it to grip the stalks against the support and wherein the means for automatically releasing the leaf gripping means as the bundles are tied comprise means on the machine and coacting with the spring-loaded bar as the leaf gripping means move after tying of each bundle, to reset the spring-loaded bar and release the bundle.

12. A machine as claimed in claim 9, wherein the means for driving the conveyor and the means for advancing the stick are designed to operate intermittently so that the bundles and stick are stationary during each tying operation.

13. A machine as claimed in claim 9, wherein the means for driving the conveyor and the means for advancing the stick are designed to operate intermittently so that the bundles and stick are stationary during each tying operation, the means for driving the conveyor being adapted to drive the conveyor at a greater linear speed than the stick feed.

14. A machine as claimed in claim 9, wherein leaf guides are provided to assist in supporting the leaves during the tying thereof.

15. A machine as claimed in claim 9, wherein the conveyor means comprise a chain at each side of the machine and to which the gripping means are secured at spaced intervals, and the means for guiding each conveyor chain comprise sprockets one of which is disposed adjacent to the tying position, so that as the stick and chain are advanced atfer each tying operation the direction of the chain passing around the said sprocket results in the released gripping means moving rapidly away from the stick.

16. A machine as claimed in claim 9, wherein the means for securing the string to the stick before and after loading of the stick comprise an automatic stapler adapted to drive staples astride the string and into the stick at the appropriate intervals.

17. A machine as claimed in claim 9, wherein the means for securing the string to the stick before and after loading of the stick comprise an automatic stapler adapted to drive staples astride the string and into the stick at the appropriate intervals, automatically operable guiding means being provided to bring the string into the correct position preparatory to driving the last staple into the stick.

18. A machine as claimed in claim 9, wherein the means for securing the string to the stick before and after loading of the stick comprise an automatic stapler adapted to drive staples astride the string and into the stick at the appropriate intervals, automatically operable guiding means being provided to bring the string into the correct position preparatory to driving the last staple into the stick, the tying means being operable to stop after each loading cycle to hold one end of a part of the string substantially centrally over the stick and the stapling means being adapted to drive the staple over the string between the two points at which it is held.

19. A machine as claimed in claim 9, wherein the means for securing the string to the stick before and after loading of the stick comprise an automatic stapler adapted to drive staples astride the string and into the stick at the appropriate intervals, automatically operable guiding means being provided to bring the string into the correct position preparatory to driving the last staple into the stick, the tying means being operable to stop after each loading cycle to hold one end of a part of the string substantially centrally over the stick and the stapling means being adapted to drive the staple over the string between the two points at which it is held, and wherein the positioning of the string by the last staple in each completed stick is relied on for the first stapling operation on the next stick which is advanced behind the completed stick.

20. A machine as claimed in claim 9, wherein the drive to the machine is substantially continuous, and means are provided for automatically stopping the tying movements after each stick is loaded and until ready to commence tying operations on the next stick.

21. A machine as claimed in claim 9, wherein means are provided for synchronising the stick feed so that before each stick is loaded it is advanced to the proper starting position.

22. A machine as claimed in claim 9, wherein means are provided for synchronising the stick feed so that before each stick is loaded it is advanced to the proper starting position, the normal stick feed being carried out by pressure of feeding means between which the stick passes and for synchronising purposes the feeding pressure being automatically releasable, a kick-through mechanism being provided to drive the stick through until it abuts against an automatically actuable stop which is adapted to be automatically retracted after the stick is synchronised and the normal stick feed is again engaged.

23. A machine as claimed in claim 9, wherein the means for automatically removing each loaded stick from the loading position are adapted to remove the said loaded stick to the side and a carriage is provided to support the front end of each stick when necessary during the loading operations, the carriage being adapted to be advanced by end pressure of the stick thereagainst, and to release the loaded stick when side pressure is applied by the stick removal means, holding means being also provided for holding the carriage in advanced position, said holding means being automatically releasable when the loaded stick is quite clear of the carriage.

24. A machine as claimed in claim 9, wherein the means for removing the loaded stick to the side after loading comprise stick removal pawls adapted to pass each loaded stick in turn to mechanically driven stick removal conveyor chains which engage beneath the end portions of the sticks and continue to remove the sticks to the side.

K. R. FUNNELL.

References Cited in the file of this patent

UNITED STATES PATENTS

| Number | Name | Date |
|---|---|---|
| 980,430 | Olds | Jan. 3, 1911 |
| 1,076,902 | Merritt | Oct. 28, 1913 |
| 1,362,893 | Paylor | Dec. 21, 1920 |
| 1,957,727 | Perkinson | May 8, 1934 |
| 1,987,844 | Bass | Jan. 15, 1935 |
| 2,131,656 | Dinkins | Sept. 27, 1938 |
| 2,327,252 | Dickerson | Aug. 17, 1943 |